United States Patent
Hopkins

(10) Patent No.: US 9,580,896 B2
(45) Date of Patent: Feb. 28, 2017

(54) APPARATUS AND METHOD FOR PROLONGED ACTIVE AGENT IN AQUEOUS SYSTEMS

(71) Applicant: John David Hopkins, Meridian, ID (US)

(72) Inventor: John David Hopkins, Meridian, ID (US)

( * ) Notice: Subject to any disclaimer, the term of this patent is extended or adjusted under 35 U.S.C. 154(b) by 305 days.

(21) Appl. No.: 14/324,153

(22) Filed: Jul. 5, 2014

(65) Prior Publication Data

US 2016/0002904 A1 Jan. 7, 2016

(51) Int. Cl.
| | |
|---|---|
| *E03D 9/02* | (2006.01) |
| *E03D 9/03* | (2006.01) |
| *C02F 1/68* | (2006.01) |
| *C02F 1/50* | (2006.01) |
| *C02F 1/76* | (2006.01) |

(52) U.S. Cl.
CPC .............. *E03D 9/038* (2013.01); *C02F 1/688* (2013.01); *C02F 1/50* (2013.01); *C02F 1/76* (2013.01); *E03D 2009/024* (2013.01)

(58) Field of Classification Search
CPC  E03D 9/005; E03D 9/02; E03D 9/036; E03D 9/033; E03D 9/038
USPC ......... 4/227.1–227.6; 206/497, 756; 210/205
See application file for complete search history.

(56) References Cited

U.S. PATENT DOCUMENTS

| | | | |
|---|---|---|---|
| 3,924,622 A | 12/1975 | Brooke | |
| 4,203,442 A | 5/1980 | Michaels | |
| 4,217,898 A | 8/1980 | Theeuwes | |
| 4,290,426 A | 9/1981 | Luschen et al. | |
| 4,764,992 A | * 8/1988 | Delia | E03D 9/038 4/227.6 |
| 5,317,762 A | * 6/1994 | Horst | E03D 9/038 4/227.1 |
| 5,534,263 A | 7/1996 | Wong et al. | |
| 5,603,126 A | 2/1997 | Scoggins | |
| 5,667,804 A | 9/1997 | Wong et al. | |
| 5,851,406 A | 12/1998 | Jones et al. | |
| 5,881,396 A | 3/1999 | Rivera | |
| 5,902,598 A | 5/1999 | Chen et al. | |
| 6,020,000 A | 2/2000 | Wong et al. | |
| 6,124,251 A | 9/2000 | Rader et al. | |
| 6,151,722 A | * 11/2000 | Lubrano | E03D 9/037 4/225.1 |
| 6,321,392 B1 | 11/2001 | Sim | |
| 6,662,380 B1 | 12/2003 | Leonard et al. | |
| 6,863,830 B1 | 3/2005 | Purdy et al. | |
| 7,803,872 B2 | 9/2010 | Verrall et al. | |
| 8,015,629 B2 | 9/2011 | Nguyen et al. | |
| 8,465,769 B2 | 6/2013 | Petereit et al. | |
| 2004/0068781 A1 | 4/2004 | Hill | |
| 2004/0099562 A1 | 5/2004 | Vazquez | |

(Continued)

OTHER PUBLICATIONS

Kaboom® Scrub Free!® Toilet Cleaning System. Apr. 1, 2013 [retrieved Aug. 5, 2016]. Retrieved from the Internet: <URL: http://web.archive.org/web/20130401053518/http://www.kaboomkaboom.com/products/kaboom-scrub-free-toilet-cleaning-system.aspx>.

*Primary Examiner* — William Gilbert
(74) *Attorney, Agent, or Firm* — Buchanan Nipper

(57) ABSTRACT

An apparatus and method for the controlled release of an active agent into an aqueous system for a prolonged duration of time are provided. Some embodiments provide an apparatus for controlling the dissolution of at least one active agent to enable an increase in active agent lifetime.

31 Claims, 14 Drawing Sheets

(56) References Cited

U.S. PATENT DOCUMENTS

| | | | | |
|---|---|---|---|---|
| 2007/0214554 A1* | 9/2007 | Slade | ............... | E03D 9/037 4/227.1 |
| 2008/0317820 A1* | 12/2008 | Rathbone | ............... | A61D 7/00 424/438 |
| 2014/0245530 A1* | 9/2014 | Slade | ............... | E03D 9/037 4/223 |

* cited by examiner

APPARATUS AND METHOD FOR PROLONGED ACTIVE AGENT IN AQUEOUS SYSTEMS

TECHNICAL FIELD

The present embodiments relate generally to prolonged treatment of aqueous systems by the controlled delivery of an active agent thereto.

BACKGROUND

Chemical compounds having antimicrobial properties have been developed over the years to reduce, eliminate and prevent microbiological growth and proliferation in aqueous systems. These compounds, generally known as cleaners, disinfectants, sanitizers, antiseptics, oxidizers, deodorizers, etc., are placed within an aqueous system to eliminate existing or prevent future microbial growth and are preferred in operation for their automatic nature over alternative methods of controlling microbiological growth which often require frequent user intervention. However, conventional antimicrobial products which are automatically delivered into an aqueous system require periodic user intervention needed to maintain effective concentration levels of antimicrobial species therein.

Conventional antimicrobial products contain at least one active ingredient and may include inert ingredients in combination. Active ingredients or "active agents" are chemical compounds typically containing a halogenated functional group such as chlorine or bromine that achieve concentration levels in aqueous systems capable of destroying microbes by forming compounds such as hypobromous or hypochlorous acid when antimicrobial active agents are dispensed in water. Active agents may generally refer to other useful compounds including water clarifying agents, perfumes, dyes, chelating agents, surfactants, etc. Inert ingredients are any other compounds contained in the product formulation other than the active ingredients. Inert ingredients give additional properties to the antimicrobial product and may include wetting agents, neutralizers, buffering agents, adhesives, acidifying agents, suspension agents, etc., that aid the manufacturing process, control dissolution rates, and facilitate the combination of powders containing the active and inert ingredients into solid forms such as tablets.

Industrial or residential aqueous systems prone to microbiological proliferation that may benefit from the use of antimicrobial compounds include but are not limited to toilets, water storage systems, ponds, pools, hot tubs, water recirculation systems, drinking water, wastewater treatment, etc. In operation, solid forms containing active agents are placed in fluid communication with an aqueous system and dissolution of the active agent from a solid form to a soluble form occurs over time accompanied by an increase in active agent concentration within the fluid of the aqueous system. When an active agent containing a halogen functional group is placed in contact with the water of an aqueous system, for example a toilet tank or placed in the path of water being dispensed into the toilet bowl, the concentration of soluble halogen species in the toilet bowl may increase over time to levels effective for antimicrobial control. When the toilet is flushed, the water containing the soluble active agent is supplied to the toilet bowl to achieve a concentration of halogen capable of microbiological control within the toilet bowl.

Examples of active agents capable of microbiological control typically contain halogenated functional groups including but not limited to: N-chloro-phthalamide, N-bromo-phthalamide, N-dichloro-p-toluene sulphonamide, 2,5-N,N'-dichloroazodicarbonamidine hydrochloride, N,N'-dichloro-dimethylhydantoin, dichloro-5,5-methylethyl hydantoin, N-bromo-N'-chlorodimethyl-hydantoin, N,N'-dibromo-dimethylhydantoin, N-bromo-N-chloro-diphenyl-hydantoin, N,N,N,N-tetrachlorodimethylglycoluracil, N-bromo-N,N-dichloro-dimethylglycoluracil, N,N'-dibromo-dimethyl-glycoluracil, N,N,N,N-tetrachloroglycoluracil, N,N-dichlorodichloroyl, N-bromo-N-chlorosodium cyanurate, dibromo triethylene diamine dihydrochloride, bromo-chlorotriethylene diamine dihydrochloride and N,N,N-trichloro-melamine, trichloro-s-triazinetrione, or combinations thereof. Active agents, referred to herein, may be incorporated into solid forms such as powders or tablets, liquids, gels or other forms suitable to be deployed into an aqueous system of use. Active agents are not limited to those having antimicrobial properties and may be expanded to include any chemical compound which produces a desired effect within an aqueous system. Active agents having antimicrobial properties are referenced as examples herein but such examples are not intended for the purpose of limiting the scope of the invention.

In conventional operation utilizing antimicrobial active agents, a solid tablet or multiple tablets containing at least one antimicrobial active agent or combinations of antimicrobial agents are placed in fluid communication with an aqueous system. Fluid communication may be achieve by placing the active agent directly into the fluid of an aqueous system of use or by creating a fluid circulation path containing the active agent in which fluid is input and subsequently dispensed or released into the aqueous system after contacting and dissolving the active agent. Dissolution of the active agent and release into the fluid of an aqueous system results in a measurable increase in the concentration level of active agent within the fluid. As dissolution continues over time, the tablet volume and surface area simultaneously decrease leading to a gradual decrease in the overall rate of active agent delivery. The decreasing rate of active agent delivery may negatively impact the effectiveness of microbiological control including increasing the amount of time required to reach active agent concentration levels capable of effective antimicrobial control and may also lead to variable active agent concentrations within an aqueous system over the tablet lifetime.

The term "lifetime" with respect to the active agent as referenced herein, will refer to the time period starting when the active agent is introduced into fluid contact with an aqueous system and ending when the active agent has been completely dissolved into the aqueous system. The term "effective lifetime" as referenced herein, will refer to the time period starting when the active agent is introduced into fluid contact with an aqueous system and ending when the active agent dissolves to a point of no longer being capable of achieving a desired function. For example, when referring to the effective lifetime of an antimicrobial active agent in tablet form, dissolution of the tablet until a substantially smaller portion of the tablet remains in the aqueous system, a reduced tablet surface area may limit the ability to achieve a concentration of active agent effective for microbiological control.

The concentration range of active agent effective for microbiological control may be placed within an optimal concentration window bounded by an effective upper concentration limit and an effective lower concentration limit depending on the antimicrobial and solubility properties of the specific active agent or combination of active agents selected. Measured concentration levels of active agent within an aqueous system falling below the lower concentration limit may result in microbiological proliferation and the inability to destroy microbes due to ineffective active agent concentrations whereas concentration levels above the upper concentration limit are wasteful of the active agent and uneconomical to the user. Ideally, constant and controllable concentration levels of active agent are maintained within the aqueous system throughout the tablet lifetime. Maintaining an effective concentration range of active agent may be accomplished by achieving zero-order release of active agent. Zero-order release of active agent may further be defined as supplying active agent into the aqueous system at a rate that does not change substantially with time. The terms "dispense" or "delivery" or "release" may further be defined as either the active or passive transfer or movement of a substance from one position to another position such as the transfer or movement of an active agent from an apparatus housing the active agent and into an aqueous system and are used interchangeably herein without limiting the scope of the invention.

Zero-order release of active agent maintains a consistent and controllable dissolution profile over time allowing a constant amount of active agent to be released into an aqueous system per unit time. However, due to the change in surface area over time, conventional antimicrobial active agents and devices placed within an aqueous system may not be capable of achieving a zero-order release profile. When the dissolution profile of conventional antimicrobial active agents including tablet forms are traced over tablet lifetime, concentrations of active agent higher than the upper concentration limit are achieved in the beginning of the tablet lifetime and concentrations below the lower concentration limit are achieved approaching the end of the tablet lifetime corresponding to a decrease in antimicrobial active agent size and surface area available for dissolution over time. Thus, the amount of active agent supplied at the beginning of the antimicrobial active agent lifetime is excessive and wasteful as concentrations reach higher levels than necessary and the amount of active agent delivered at the end of the antimicrobial active agent lifetime is ineffective for microbiological control due to being below the effective lower concentration limit. As described, the effective lifetime of the tablet is reached prior to complete tablet dissolution resulting in further waste of active agent when the tablet surface area is reduced below levels capable of effective microbiological control. It is desirable to maintain the concentration of active agent within an optimal range throughout the lifetime of the tablet to maximize the antimicrobial efficiency while minimizing or eliminating waste or excessive use of the active agent beyond what is necessary for effective microbiological control. It is further desirable to increase both the active agent lifetime and effective lifetime beyond the lifetimes of conventional active agents.

The lifetimes of conventional antimicrobial active agents and devices typically range from 1-4 months, for example when antimicrobial active agent tablets are used for microbiological control in a toilet. Users may find it preferable to maximize the lifetime of the tablet so as to reduce the frequency of tablet replacement and associated replacement costs so as to maximize the cost effectiveness of antimicrobial products. Increasing tablet lifetime has been proposed in the prior art and methods include increasing the tablet size, modifying the tablet composition including the addition of a longevity agent having a slower dissolution rate than the active agent so as to reduce the overall dissolution rate, applying higher pressure compression of the tablet during manufacture, and multilayered or multi-component tablets. However, problems maintaining optimal concentrations of active agent arise when the methods described are reduced to practice.

Increasing the size of the tablet as a means of increasing tablet lifetime yields active agent concentrations higher than the upper concentration limit resulting in waste of the active agent as excessive concentrations are achieved in addition to other adverse effects including damage to components of an aqueous system. In addition, high concentrations of chlorine containing active agents may produce an undesirable chlorine odor noticeable to the user. Increasing the size of the tablet increases manufacturing costs which are passed on to the consumer at an economic disadvantage given that more active agent will be used than is necessary for effective microbiological control near the beginning of the tablet lifetime. For the combined purpose of increasing the lifetime of the tablet, maintaining zero-order release of active agent, and keeping active agent concentrations within an optimal concentration window bounded by upper and lower concentration limits, it is desirable to place a larger quantity of active agent into an aqueous system such as by increasing the tablet volume or quantity of tablets while at the same time, controlling the amount of active agent released into an aqueous system per unit time.

Decreasing tablet solubility and thereby, the rate of dissolution by using additives in the composition of the tablet or increasing the compression ratio during tablet manufacture are effective at increasing the lifetime of the tablet but may reduce the concentration of active agent to levels below the lower effective concentration limit, thus, negatively impacting the ability to prevent microbiological proliferation. Further, the use of inert additives for the purpose of controlling the overall tablet dissolution rate which do not contribute to the antimicrobial properties of the tablet will reduce the value delivered to the user by reducing the amount of active agent in the tablet and may increase the tablet's manufacturing complexity and cost.

The use of multi-layered tablets having a low solubility region surrounding a region of higher solubility may also increase the lifetime of the tablets but also increase manufacturing costs and complexity. To benefit the user economically, it is desirable to increase the lifetime of the tablet while maintaining optimal concentration levels of active agent within an aqueous system without impacting tablet manufacturability or production costs.

Handling of chemical products may pose a health risk to the end user due to the strong oxidizing effects of antimicrobial active agents. Conventional antimicrobial tablets containing an active agent are commonly packaged in child resistant films that require the user to cut open the package to gain access to the tablet. Cutting the packaging open and exposing the tablet places the user at risk of chemical contact especially if the user must manually place the product within an aqueous system such as a toilet tank. It is desirable to provide an apparatus which limits or eliminates the user's risk for chemical exposure.

Devices containing an active agent which are disposed directly into an aqueous system often have multiple parts which add complexity during manufacturing. It is desirable to produce a device capable of microbiological control in aqueous systems that may be manufactured at a low cost and in a simple manner. Devices designed to be placed directly into the toilet bowl are visible to the user and may be undesirable. To improve aesthetic value, it is desirable for the microbiological control device to be hidden from view of the user such as by placement into the tank of the toilet.

Aqueous systems in which an active agent is disposed may have frequent exchanges of water that replace water containing a measurable concentration of active agent with fresh water or water having a lower concentration of active agent. For example, a system such as a toilet in which the water in contact with the active agent is exchanged frequently with fresh water may require a higher surface area of exposure of active agent to achieve a given concentration of active agent within a given period of time between water exchanges compared to a system in which the water is exchanged less frequently. For the purpose of achieving a desired concentration of active agent within an aqueous system, it is desirable to enable metered or incremental amounts of active agent into an aqueous system depending on the frequency that water is exchanged within the system. In operation, a user may place multiple units of the microbiological control apparatus into a toilet that is frequently flushed while reducing the number of units placed within a toilet that is less frequently flushed. The ability to control the number of units supplied to an aqueous system also prevents using excessive amounts of active agent especially in aqueous systems having a fluid that is less frequently exchanged. Active agents and devices known in the prior art may not provide the ability to modify the amount of active agent delivered into an aqueous system.

SUMMARY OF THE INVENTION

An object of the invention is to provide an apparatus for the controlled release of an active agent into an aqueous system for a prolonged duration of time. Controlled release refers to the ability to deliver a specified amount or rate of active agent to an aqueous system of use by providing an apparatus that regulates the dissolution profile of the active agent. In one example, the apparatus may release a relatively constant amount of active agent per unit time. In one example, the apparatus may release a high amount of active agent for a short period of time followed by a relatively constant amount of active agent for a prolonged duration of time. Prolonged duration refers to a length of time exceeding what would otherwise be expected for conventional delivery of the active agent such as when placing the active agent in tablet form directly into the tank of a toilet or in line with water being dispensed directly into the toilet bowl. In some embodiments prolonged duration may refer to a period of time greater than approximately 4 months. In some embodiments prolonged duration may refer to a period of time greater than approximately 1 year. In some embodiments prolonged duration may refer to a period of time greater than would otherwise be expected in reference to the conventional dissolution characteristics of a given active agent. For example, the lifetime of a specific active agent when placed in the tank of a toilet either directly or disposed within an apparatus known in the prior art may be 2 months. When the same active agent having a lifetime of 2 months is disposed within an apparatus according to some embodiments of the invention, the lifetime may be extended.

A further object of the invention is to provide an apparatus that supplies an active agent to an aqueous system while maintaining concentration levels of active agent within an optimal range throughout the lifetime of the active agent.

An additional object of the invention is to provide an apparatus configured to expose a constant amount of cross-sectional surface area of the active agent for the lifetime of the active agent within an aqueous system of use.

Still another object of the invention is to provide an apparatus that supplies a controlled amount of active agent into an aqueous system in which the time to reach an optimal concentration of the active agent is relatively constant throughout the lifetime of the active agent within an aqueous system of use.

A further object of the invention is to provide an apparatus that reduces the surface area of an active agent exposed for dissolution within an aqueous system, such as a tablet form containing the active agent, so as to prevent excessive concentrations of active agent from being released into the aqueous system beyond what is necessary for effective microbiological control and to maintain the active agent concentration within an optimal range.

Still another object of the invention is to provide an apparatus for the delivery of an active agent into an aqueous system of use that reduces the chemical odor associated with excessive concentrations of active agent especially when the active agent is composed of a halogen containing compound such as chlorine or bromine.

Another object of the invention is to provide an apparatus for the delivery of an active agent into an aqueous system that may be simply and cost effectively manufactured.

A further object of the invention is to provide an apparatus for the delivery of an active agent into an aqueous system that protects the user from direct physical contact with the active agent.

Still another object of the invention is to provide an apparatus for the delivery of an active agent into an aqueous system of use that enables a large amount of active agent to be placed therein while selectively delaying the dissolution thereof so as to prolong the lifetime of the active agent and, thereby, reduce the frequency of user intervention needed for replacing the apparatus.

Still another object of the invention is to provide an apparatus for the delivery of an active agent into an aqueous system of use that enables the placement of a bulk volume of active agent into an aqueous system but limits the surface area of said bulk quantity of active agent available for dissolution to an area smaller than the total surface area of the bulk quantity of active agent at any given time so as to prolong the lifetime of the bulk quantity of active agent.

It is a further object of the invention to provide an apparatus for the delivery of an active agent into an aqueous system of use that allows for metered control of the surface area of the active agent exposed dependent on the amount of active agent required to achieve a desired concentration and a surface area correlating to the approximate frequency that water is exchanged within the aqueous system such as by placing multiple individual units into a toilet that is flushed frequently and a smaller quantity of units in a toilet that is flushed less frequently.

It is a further object of the invention to provide an apparatus for delivery of an active agent into an aqueous system which, in the case of an aqueous system such as a toilet, the apparatus is contained within the tank of the toilet so as to be hidden from view of the user.

It is a further object of the invention to provide an apparatus for delivery of an active agent into an aqueous system that gives an economic advantage to the user over conventional active agents and devices.

In accordance with the present invention, an apparatus is provided for the prolonged delivery of an active agent into an aqueous system, the apparatus comprising: a container comprising a polymeric layer, said polymeric layer forming a reservoir therein for housing an active agent, at least one opening formed within the container allowing passage of fluid from an aqueous system into the reservoir, wherein the release of fluid and active agent through the container opening and into the aqueous system increases the concentration of active agent within the aqueous system.

The term "reservoir" is defined herein as a structure for holding or housing at least one active agent or a fluid or a combination of at least one active agent and a fluid.

In a some embodiments, the container comprises a polymeric layer essentially impermeable to fluids and essentially impermeable to active agent so as to enable dissolution of active agent in regions of the reservoir exposed by an opening and restricting dissolution of active agent where the polymeric layer makes contact with or impedes the exchange of fluid flow to the active agent. Thus, the dissolution rate of the active agent is controlled by exposing only a portion of the active agent to fluid communication with the aqueous system through the opening formed in the container allowing exchange of fluid into the reservoir and dissolution of the active agent only in the exposed regions. Increasing active agent concentration levels within a fluid may occur at a rate proportional to the tablet surface area exposed to fluid communication with the aqueous system and may be enhanced or reduced by controlling the rate of fluid flow in communication with the active agent or by controlling the volume of fluid in which the active agent is disposed or combinations thereof. An active agent having a fluid solubility limit may be disposed within a reservoir having a volume sufficient to dissolve a given amount of active agent while restricting further dissolution when a saturation limit has been reached.

In some embodiments, an active agent is housed within a reservoir exposing a constant cross-sectional area of the active agent for fluid communication with an aqueous system of use over the lifetime of the active agent.

In some embodiments, an active agent having a fluid solubility limit is housed within a reservoir having a volume sufficient to dissolve a fixed amount of active agent.

In some embodiments, an active agent is housed within a reservoir having regions of relatively high fluid flow and regions of low fluid flow.

In some embodiments, the reservoir restricts or eliminates fluid exchange to the active agent in contact regions between the reservoir and the active agent.

In some embodiments, the active agent protrudes from the container opening.

In some embodiments, the diameter or cross sectional area of the container opening approximates the diameter or cross sectional area of the tablet.

In some embodiments, the diameter or cross sectional area of the container opening is larger than the diameter or cross sectional area of the active agent.

In some embodiments, the active agent is formed into a tablet structure or plurality of tablet structures having an elongated axis.

In some embodiments, the active agent is formed into an elongated tablet structure or a plurality of tablets arranged to create a structure having an elongated axis, said tablet structure having a constant cross sectional area along the length of the elongated axis.

Prolonged lifetime and controlled release, dispensing or delivery of the active agent may be accomplished in some embodiments by limiting the surface area of active agent available for fluid communication with an aqueous system and restricting dissolution of active agent to an axis having a cross sectional area. However, it may also be desirable to release variable but controlled amounts of active agent into an aqueous system at specific points in the lifetime of the active agent. For example, a loading phase characterized by a high rate of release of active agent at the beginning of the active agent lifetime may increase the concentration of active agent within an aqueous system to a desired level followed by a maintenance phase characterized by a relatively slower rate of release of active agent to achieve a sustained concentration level of active agent. In some embodiments, the active agent is manufactured in the form of a solid elongated tablet or formed by a plurality of tablets arranged into an elongated shape having a constant cross sectional area. For example, a cylindrically shaped structure may be formed by stacking two or more cylindrical active agent tablets. In some embodiments, the release rate of active agent is controlled by varying the amount of surface area of active agent exposed throughout the lifetime of active agent.

In one example, at least two cylindrical active agent tablets are stacked end-to-end to form an elongated cylindrical structure and disposed within a container comprising a reservoir, the reservoir having an elongated axis and a polymeric layer for covering the surface of an active agent along an elongated axis. At least one opening is formed in the container to provide fluid communication between an aqueous system and an active agent, said opening exposes a portion of the active agent to fluid communication with an aqueous system of use. In some embodiments, at least one opening may be formed in the end of the container. The polymeric layer may act to prevent or reduce dissolution rates of the active agent in regions perpendicular to the elongated axis but may not prevent or reduce dissolution of active agent in regions exposed by the opening in the container. Thus, substantially directional dissolution of the active agent is possible. Elongating the active agent volume in a direction parallel to the direction of dissolution may increase the lifetime of the active agent. The term "polymeric layer" is defined herein as at least one polymeric layer and is not intended to limit the scope of the invention. For example, a polymeric layer may describe multiple layers of different types of films including non-polymeric films manufactured together into a single layer, such as being co-extruded or cross laminated during manufacturing including but not limited to polyethylene terephthalate (PET), polyethelene (PE), nylon (NY), metallized polyethylene terephthalate (MPET), oriented polypropylene (OPP), ethylene vinyl alcohol (EVOH), polyvinylidene chloride coated polyethylene terephthalate (KPET), etc., including combinations thereof. Combinations of the materials above may be used to form multi-layered films such as PET/KPET/PET/PE, PET/AL/PA/PE, PET/PE, etc. Such polymeric layers and combinations thereof may be selected to provide desirable properties such as chemical resistance, puncture and tear resistance, barriers to oxygen, light resistance, etc. Further, the fusion of multiple layers of film, for example by heat sealing or co-extrusion, does not depart from the scope of the definition of a polymeric layer. Similarly, the use of injection molded plastic materials, thermoformed materials or polymer sheets including both flexible and rigid materials will not depart from the scope of the invention.

When the active agent is formed into an elongated shape such as a cylinder, an essentially impermeable material may be formed around the axis of the cylinder covering a majority of the cylinder height while leaving at least one end or base of the cylinder exposed for fluid communication with the aqueous system through an opening in the container. The essentially impermeable material may be formed so as to allow, restrict or substantially reduce fluid access and exchange to portions of the active agent. In some embodiments using a cylindrically shaped active agent, the dissolution of active agent may be enabled in a direction parallel to the cylindrical axis and inhibited or reduced in a direction perpendicular to the cylindrical axis. Controlling fluid access and exchange may be enabled by modulating the distance between an active agent surface region and a polymeric layer. Because the cylinder of active agent dissolves in a direction parallel to the cylindrical axis and dissolution is inhibited or reduced in a direction perpendicular to the cylindrical axis, a relatively constant surface area of active agent may be exposed throughout the lifetime of the active agent. In one embodiment, controlled or more specifically, zero-order release of the active agent is achieved by maintaining a constant and uniform surface area of active agent exposed in the direction of dissolution.

The embodiment describing a cylindrically shaped active agent may be generalized to refer to any shape of active agent having a uniform or relatively uniform cross sectional area in any given direction along an axis of the active agent. Specific shapes may be manufactured as the active agent, contained in a powdered form, is compressed into tablets. The tablets may be combined or stacked together to form an elongated shape or may be manufactured as the desired shape. The stacked configuration allows the use of tablets containing unique active agents thereby enabling the ordered and sequential delivery of various active agents to an aqueous system depending on the requirements for active agent delivery and the order or arrangement of tablets.

In some embodiments, an elongated cylindrical structure is formed by alternating placement of tablets containing 1-bromo-3-choro-5,5-dimethylhydantoin and trichloro-s-triazinetrione. In some embodiments, an elongated cylindrical structure is formed by alternating placement of tablets containing 1-bromo-3-choro-5,5-dimethylhydantoin and 1,3-dichoro-5,5-dimethylhydantoin. The alternating arrangements of tablets in these examples provide at least two distinct active agent types to be administered sequentially into an aqueous system. An advantage of such an arrangement includes the ability to sequentially dispense chemicals which may not be compatible if simultaneously mixed together. A further advantage is the ability to prolong the lifetime of the bulk volume of agent by incorporating slower dissolving components, for example, a tablet having a slower dissolution rate is alternated with a tablet having a faster dissolution rate. It may further be desirable to administer multiple types of active agents into an aqueous system in order to optimally achieve a desired effect.

In some embodiments, the lifetime of the active agent may be prolonged significantly by increasing the length and, thereby, volume of the active agent in the direction of dissolution oriented parallel to an elongated axis having a constant or uniform or variable cross sectional area of active agent exposed for dissolution. In some embodiments, the lifetime of the active agent may be prolonged significantly by increasing the length and, thereby, volume of the active agent in the direction of dissolution. In this manner, the surface area of the active agent exposed for dissolution remains constant or variably controlled while the bulk volume of active agent in the aqueous system may be increased resulting in prolonged active agent lifetimes and, in some embodiments, approximating a zero-order controlled release of active agent.

In some embodiments, the lifetime of the active agent may be prolonged significantly by increasing the length and, thereby, volume of the active agent in the direction of dissolution.

A method of manufacturing one embodiment includes providing an active agent, wrapping, coating or positioning the active agent in a polymeric layer along an axis having a constant or uniform cross sectional area wherein the active agent is exposed through an opening in the polymeric layer. In a method in which a polymer film is wrapped around an active agent, the polymer film may preferably be a heat shrinkable polymeric material including but not limited to polyvinylchloride (PVC) placed around the active agent and heated to a temperature capable of shrinking the polymer film to precisely cover the active agent along an elongated axis while leaving at least one opening therein.

In one example, the heat shrinkable polymeric material film is placed over a plurality of cylindrically shaped tablets containing an active agent stacked end to end to create an elongated cylindrical structure and heated to a temperature below 350 degrees Fahrenheit. The polymeric film is allowed to shrink to a diameter approximating the diameter of the active agent.

In one example, an active agent is placed into a container such as a thermoformed container having cavities or reservoirs pre-formed therein. An opening in the container allows fluid communication with the active agent housed within the cavities or reservoirs formed within the container.

In one example, a container such as a thermoformed container having cavities or reservoirs pre-formed therein is used to house an active agent, said container having an input port for introducing fluid into the reservoir and an output port for releasing fluid from the reservoir. In some embodiments a tube or hose or other suitable element may be connected to the input port to allow fluid to be dispensed into the container. Similarly, a tube or hose or other suitable element may be connected to the output port to allow fluid and active agent to be released from the container into the aqueous system. A watertight seal may be formed around the container edges to limit fluid exchange only to the input and output ports. In some embodiments the fluid input or output ports may comprise an opening such as an opening formed within a container. In some embodiments the fluid input or output ports may comprise a pipe, tube or channel. In some embodiments the fluid input or output ports may be formed by a polymeric layer, said polymeric layer may be continuous with a reservoir housing an active agent. In some embodiments, the fluid input or output ports may be formed by a separate material from the polymeric layer forming a reservoir. In some embodiments, the fluid input or output ports may comprise a spout, for example a fitment. In some embodiments, a spout may provide mechanical support to the input or output ports, the mechanical support may enable attachment of a tube or hose or other suitable element. In some embodiments, a port may comprise a reinforced region in a polymeric layer. In some embodiments, a port may comprise a region in a polymeric layer suitable for forming a channel such as by attaching a connector, a tube, a hose or other suitable element for channeling the passage of fluid from an aqueous system.

In some embodiments, an apparatus for the microbiological control of aqueous systems is provided, said apparatus comprising a first reservoir for housing an active agent, a second reservoir enclosing said first reservoir. In the described embodiments, a first reservoir may provide directional dissolution of an active agent while a second reservoir may provide saturation limited dissolution of an active agent.

In some embodiments, an active agent is disposed within a reservoir formed in a pouch or bag structure. In some embodiments, an active agent is disposed within a reservoir comprising a volume for holding a fluid and active agent or plurality of active agents, said reservoir formed within a pouch or bag, said active agent dissolves within the reservoir held within the fluid approaching or reaching a saturation limit of active agent within the fluid. In some embodiments a plurality of active agent tablets comprising at least one active agent may be disposed within a reservoir and arranged or configured to restrict or partially restrict the exchange of fluid to only partial surfaces of the active agent. In one example, an active agent tablet among a plurality of active agent tablets having a surface area positioned adjacent to a surface of the polymeric layer forming a pouch or bag or adjacent to another active agent tablet may provide a reduced dissolution rate and exhibit an increased lifetime. In some embodiments, a plurality of active agents positioned within a reservoir provide a high surface area for dissolution but the dissolution rate is slowed or approaches zero as the saturation limit of the active agent within a volume of fluid is approached. Further, a saturation limited configuration combined with a high surface area of active agent available for dissolution may provide a rapid increase in active agent concentration within a reservoir followed by slowed or inhibited active agent dissolution rate after a saturation limit has been reached.

A reservoir housing an active agent may be configured to hold both active agent and a volume fluid. In some embodiments, an active agent disposed within a reservoir may have a solubility limit within a volume of fluid, said volume of fluid may be held within a reservoir in fluid contact with said active agent, wherein dissolution of the active agent within the fluid occurs until a saturation limit of the active agent is reached. Saturation of the active agent within a volume of fluid provides the ability to control the dissolution profile and lifetime of the active agent such as by modulating the volume of the reservoir or by modulating the solubility limit of the active agent or combinations thereof.

Some embodiments combining both directional dissolution and saturation limited dissolution of an active agent may further increase the lifetime of the active agent and provide additional means for controlled delivery of the active agent into an aqueous system. In one example, an active agent may be coated or wrapped in a polymeric layer and said wrapped or coated active agent is placed into a reservoir. The reservoir may be sealed around the edges such as by heat sealing to enclose an active agent that may be coated or wrapped in a polymeric layer to create a reservoir around said active agent, said reservoir being capable of holding a volume of fluid and an active agent.

In some embodiments, an active agent may be coated or wrapped in a polymeric layer and said wrapped or coated active agent is placed into a second container, said second container forming a reservoir housing the wrapped or coated active agent. In the embodiment described, the fluid held in the reservoir of the second container may be in communication with an active agent wrapped or coated in a polymeric layer, wherein said fluid within the reservoir becomes saturated with dissolved active agent and the saturation of active agent within the fluid acts to limit, inhibit or reduce further dissolution of the active agent. The volume of fluid held within the reservoir limits the amount of active agent capable of being dissolved to a saturation level of the active agent typically designated as a weight of active agent per unit volume of fluid. For example, a large reservoir will allow a higher total weight of active agent dissolved when compared to a smaller reservoir. In the case that the fluid in the reservoir is exchanged periodically, for example when used in a toilet the water in the reservoir is exchanged when the toilet is flushed, it may be desirable to inhibit the dissolution of active agent so as to keep the concentration of active agent within an optimal concentration window. The reservoir volume may be used to control both the lifetime of the active agent housed within the reservoir and the amount of active agent delivered to an aqueous system of use.

In some embodiments, an active agent is disposed directly within a reservoir having a volume for holding fluid, wherein the active agent dissolves within the fluid until a saturation limit of dissolved active agent within the fluid has been reached.

In one example, an active agent having a solubility limit of 1.5 grams of active agent per liter of water is housed within a reservoir having a volume of 1 liter of water. After a period of time sufficient to dissolve 1.5 grams of active agent within the 1 liter of water contained in the reservoir, the dissolution rate of active agent becomes significantly reduced or stopped because the solubility limit of the active agent has been achieved. Thus, the dissolution of active agent held within the reservoir reaches a saturation limit and the volume of the reservoir act to control the amount of active agent delivered to the aqueous system during each exchange of fluid contained within the reservoir, such as when a toilet is flushed. The overall dissolution rate and lifetime of the active agent may be controlled. Further, the amount of active agent delivered to the aqueous system during the output of water and active agent from a reservoir and into the aqueous system such as by flushing a toilet may be controlled by modulating the solubility limit of the active agent housed in the reservoir, modulating the volume of the reservoir holding a volume of fluid or by using multiple types of active agents arranged in sequential fluid communication within the reservoir, or combinations thereof.

In one example, the lifetime and dose of active agent delivered to an aqueous system are optimized for delivering an antimicrobial active agent to a toilet bowl by providing a reservoir of suitable volume and an active agent housed within the reservoir having a dissolution rate and a solubility limit so as to achieve a dissolved amount of active agent contained within the fluid of the reservoir approximating the solubility limit of the active agent. In between exchanges of fluid and active agent from the reservoir, such as between toilet flushes, the dissolved active agent housed within the reservoir may rapidly achieve a solubility limit within a reservoir of suitable volume to deliver a metered and controlled dose of active agent to the toilet bowl for every flush of the toilet.

In some embodiments, multiple types of active agents having varying dissolution rates and solubility limits are housed within a reservoir, the active agents are configured within polymeric layers so as to control the dissolution rates depending on the given dissolution rates and solubility limits. Active agents having high dissolution rates are housed within a reservoir comprising a first polymeric layer and placed within a second reservoir formed by a second polymeric layer, whereas active agents having lower relative dissolution rates are placed directly in the reservoir formed by a second polymeric layer.

In some embodiments, the solubility limits of active agents are utilized to extend the active agent lifetimes and deliver an optimal dose of active agent to an aqueous system when used in conjunction with a suitably sized reservoir. For example, the active agent trichloro-s-triazinetrione has antimicrobial properties and a solubility limit of approximately 34 grams per liter of water. To deliver an appropriate dose of trichloro-s-triazinetrione to an aqueous system and to prolong the lifetime of trichloro-s-triazinetrione within an aqueous system, a reservoir having a volume suitable to dissolve a desired amount of trichloro-s-triazinetrione as limited by the solubility thereof is selected. Thus, the reservoir volume is optimized to extend the lifetime of the active agent and deliver an appropriate dose of active agent to an aqueous system.

To further extend the active agent lifetime, a polymeric layer covering a portion of the active agent may be utilized so as to reduce or eliminate the dissolution of active agent in the region covered by the polymeric layer. The active agent may be covered in a first polymeric layer and housed within in a reservoir formed by a second polymeric layer. In some embodiments, the reservoir may be shaped or formed to approximate the shape of the active agent, such as by thermoforming a cavity or recessed region in a polymeric layer or providing a pouch or bag of suitable volume and placing an active agent in the reservoir so as to limit or enhance the dissolution of active agent in regions of the polymeric layer as defined by the shape of the recess or cavity formed therein. In some embodiments, a reservoir is formed within a flexible pouch for housing an active agent, wherein placement of the active agent within the reservoir allows the flexible pouch to conform to the multiple surfaces of the active agent or multiple active agents.

An alternative antimicrobial active agent, 1-bromo-3-chloro-5,5-dimethylhydantoin (BCDMH) has a solubility of 1.5 grams per liter of water which is significantly lower than trichloro-s-triazinetrione. The lower solubility of 1-bromo-3-chloro-5,5-dimethylhydantoin (BCDMH) compared to trichloro-s-triazinetrione enables a longer lifetime of BCDMH under the same conditions including reservoir volume when compared to trichloro-s-triazenitrione. In some embodiments, at least two active agents having different solubility are combined and configured to optimize the dose, efficiency and lifetime of the active agents. In some embodiments, a first active agent having a high solubility may be housed in a reservoir with a second active agent having a relatively lower solubility, said first active agent having a high solubility may be at least partially covered by a polymeric layer, such as being contained within a recessed region of the reservoir matching the shape of the active agent so as to reduce the amount of dissolved first active agent per unit time. Said second active agent having a relatively lower solubility is housed within a reservoir and positioned so as to maximize the surface area of said second active agent available for dissolution. The active agents may be placed in sequential dissolution order so as to provide a high dose of active agent alternating with a low dose of active agent depending on the desired sequential arrangement. In some embodiments, random placement of active agents within a reservoir will approximate an optimal delivery concentration of active agent into an aqueous system such as by placing a plurality of small active agent tablets within a reservoir formed from a pouch or bag. Similarly, the arrangement of multiple active agents within the reservoir may be configured to provide an initial short-term high dose of active agent initially such as during a loading period for rapidly increasing the concentration of active agent within an aqueous system of use, followed by a subsequent low dose of active agent for a prolonged period of time such as during a maintenance period for sustaining active agent levels within an optimal window over the lifetime of the active agent. Some embodiments may provide a low dose of active agent for a prolonged period of time followed by periodic high doses of active agent over shorter intervals of time.

A change in the size of the reservoir over time, such as by dissolution and removal of an active agent occupying a volume in the reservoir provides a means of adjusting the dose of active agent delivered to an aqueous system. In one example, a first active agent is placed within a reservoir occupying a volume in the reservoir while a second active agent which may be the same or different type of active agent is configured within the reservoir to be slow dissolving such as by covering the active agent with a polymeric layer by means of placing the active agent in a recessed or shaped region of the reservoir, or by partially covering the active agent with a polymeric layer. As a first active agent dissolves, the reservoir volume increases allowing an increased dissolution rate of a second active agent.

Configuring an apparatus with a means to control fluid dynamics within the reservoir so as to control the fluid communication and fluid flow rates between the active agent and the aqueous system provides a further means for increasing the lifetime of active agent within an aqueous system and controlling the dissolution profile of the active agent. For example, placing a first active agent portion or first active agent surface within a reservoir region having a relatively high fluid flow rate while positioning a second active agent portion or second active agent surface within a reservoir region having a relatively low fluid flow rate may dissolve different portions of active agent at different rates. Fluid flow rates within a reservoir having a fluid input port and a fluid output port and providing fluid exchange between the input and output ports may exhibit higher fluid flow rates in regions adjacent the ports and lower fluid flow rates in regions located further from the ports. Further, parts of the apparatus including the reservoir and ports may be configured individually or in combination to reduce, disrupt or enhance the flow of fluid so as to control the dissolution rate of active agent. In some embodiments, the reservoir is configured to restrict the flow of fluid in regions of contact between the reservoir sidewall and the active agent. In some embodiments, the flow of fluid within the reservoir is configured to achieve a desired active agent dissolution profile.

In some embodiments, a first portion of active agent is positioned in a region of high fluid flow rates within the reservoir while a second portion of active agent is positioned in a region of low fluid flow rates within the reservoir, wherein a first portion of active agent dissolves at a higher rate than the second portion of active agent. In some embodiments, first and second portions of active agent are placed within a reservoir, said reservoir having regions of high and low fluid flow, wherein a first portion of active agent reduces the flow of fluid to a second portion of active agent, and wherein partial or complete dissolution of a first portion of active agent subsequently or sequentially exposes a second portion of active agent to higher fluid flow rates.

The size of the reservoir housing the active agent plays a role in the active agent lifetime. Further, the local size of the reservoir in regions surrounding portions of an active agent may be configured to slow or enhance the dissolution rate of the active agent. For example, an active agent tablet placed directly in the tank of the toilet will have a reduced lifetime compared to an active agent tablet placed in, for example a pouch having a reservoir volume smaller than the volume of the toilet tank. In some embodiments, a reservoir and active agent are configured to provide a reservoir region having larger volume relative to a first portion of the active agent and a reservoir having a smaller volume relative to a second portion of active agent, wherein dissolution of a first portion of active agent occurs at a higher rate than dissolution of a second portion of active agent.

DETAILED DESCRIPTION OF THE ILLUSTRATED EMBODIMENTS

Figure 1:
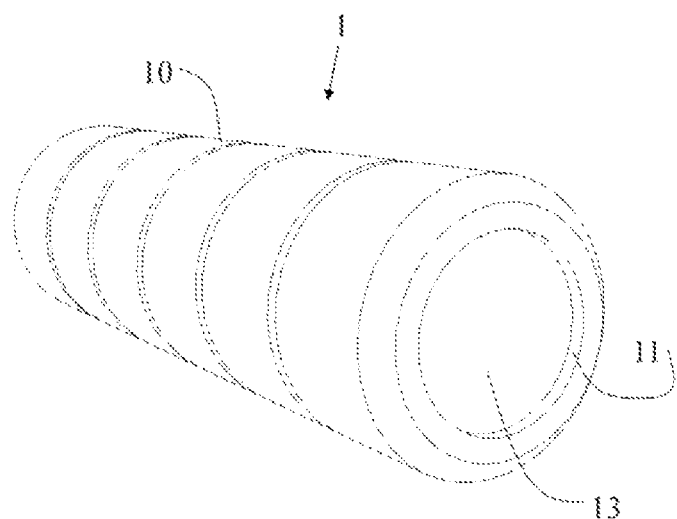
FIG. 1 is a perspective view of an apparatus for prolonged active agent delivery in aqueous systems, according to an embodiment of the invention.
Figure 2:
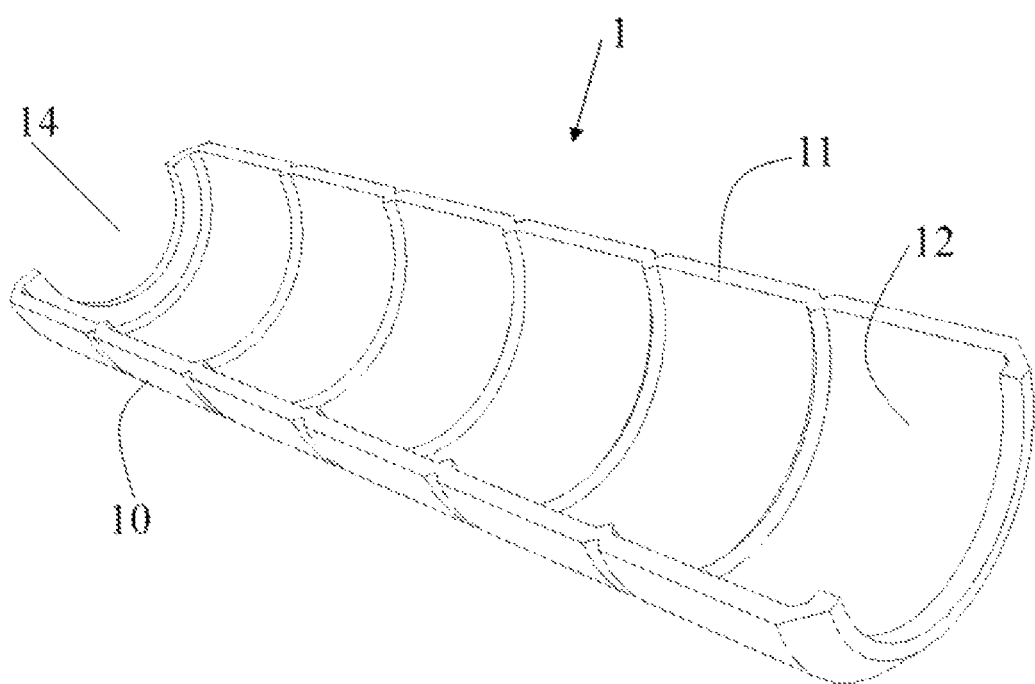
FIG. 2 is a cross sectional view along an elongated axis of an apparatus for prolonged active agent delivery in aqueous systems in which a portion of the apparatus has been removed to reveal an inner configuration, according to an embodiment of the invention.

In the following detailed description, reference is made to the accompanying drawings that form a part hereof and in which are shown, by way of illustration, specific embodiments. In the drawings, like numerals describe substantially similar components throughout the several views. Other embodiments may be utilized and structural, logical, and operational changes may be made without departing from the scope of the present disclosure. The following detailed description is, therefore, not to be taken in a limiting sense.

Referring to the drawings, and initially to FIG. 1, an apparatus 1 for prolonged active agent delivery in aqueous systems in accordance with the present invention, the apparatus comprises a container 10, a polymeric layer 11 that may be essentially impermeable to fluids surrounding a reservoir for housing an active agent 13. At least one opening is formed in the container to allow passage of fluid into the reservoir and the release of fluid and active agent from the reservoir and into an aqueous system of use so as to increase the concentration of active agent in the aqueous system. In some embodiments, the reservoir holds a plurality of active agent tablets having a diameter of approximately 1 inch and arranged to form an elongated structure. In some embodiments, at least one opening is formed in the container allowing fluid communication between the active agent and an aqueous system of use. In some embodiments, at least one active agent tablet having a diameter of approximately 3 inches is housed within the reservoir. In some embodiments, the apparatus is configured for placement on the bottom of a toilet tank. In some embodiments, the apparatus is configured to be oriented vertically so as to conserve horizontal surface space within the toilet tank such as by stacking a plurality of active agent tablets having a diameter of approximately 3 inches. In some embodiments, one end of the apparatus contains an opening to allow fluid communication between an active agent and an aqueous system of use and the opposite end of the apparatus is closed or sealed to prevent fluid communication between an active agent and an aqueous system of use. In some embodiments, the apparatus is formed by arranging active agent tablets within a beat-shrinkable material and providing a source of heat so as to form or mold the heat-shrinkable material around the arrangement of active agent tablets. In some embodiments, a polymeric container such as a thermoformed container is provided having a formed reservoir shape or multiple shapes into which one or multiple active agents may be disposed. In operation, the polymeric layer covering the active agent may provide a protection layer for the user to reduce or eliminate contact with the active agent during handling of the apparatus, for example in cases where the active agent may pose a risk of physical harm to the user. In some embodiments, a removable cover or seal may be placed over an opening in the container or any other structure providing access to the active agent, said removable cover or seal may be removed by the user during deployment of the apparatus into an aqueous system of use. In some embodiments, multiple apparatuses may be bundled together and deployed within an aqueous system as a means of providing a metered dose of active agent suitable for the specific aqueous system of use. In one example, a toilet having a low flushing frequency may require a single apparatus while a toilet having a high flushing frequency may require multiple or bundled apparatuses. In some embodiments a weight or fixing means may be provided to secure the apparatus in place within an aqueous system.

FIG. 2 is a cross sectional view cut along an elongated axis of an apparatus 1 for prolonged active agent delivery in aqueous systems, the apparatus comprising a container 10, a polymeric layer 11 which may be essentially impermeable to fluids and essentially impermeable to active agent. The polymeric layer 11 forms a reservoir 12 for receiving an active agent. At least one opening 14 is formed in the container to allow the passage of fluid into the reservoir and the release of fluid and active agent from the reservoir and into to the aqueous system. In some embodiments, the diameter of the opening 14 is smaller than the diameter of the reservoir 12 so as to retain the active agent within the reservoir. In some embodiments the diameter of the opening may be modified to control the rate of dissolution of an active agent. In operation, the apparatus may be placed directly into an aqueous system allowing fluid communication of the active agent with the fluid of the aqueous system and the release of active agent into the aqueous system. In some embodiments, the reservoir may be formed to tightly cover the contours of the active agent surface so as to limit or restrict the exchange of fluid in covered regions and, thereby, limit the dissolution of active agent in the covered regions. In some embodiments, the gaps between multiple adjacent active agent tablets may be partially occupied by the polymeric layer so as to further limit or restrict the exchange of fluid between active agent tablets and the polymeric layer. In some embodiments, the reservoir may contain a weight or other means to anchor the apparatus in place within an aqueous system of use.

Figure 3:
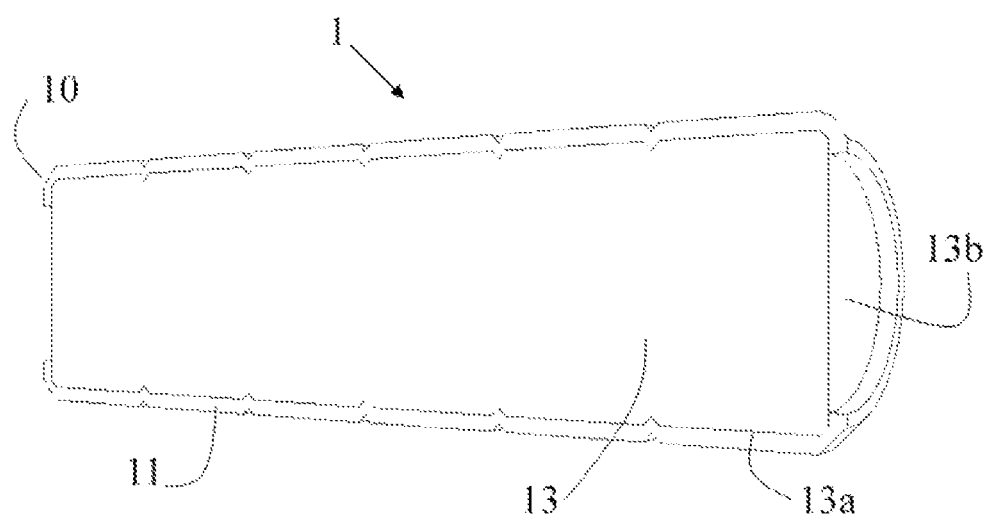
FIG. 3 is a cross sectional view along an elongated axis illustrating the operation of an apparatus for prolonged active agent delivery in aqueous systems in which an active agent is disposed, according to an embodiment of the invention.

FIG. 3 is a cross sectional view taken along an elongated axis of the apparatus 1 in which an active agent 13 is housed within a reservoir 12 formed in container 10, said active agent is surrounded by a polymeric layer 11 which is essentially impermeable to fluids and essentially impermeable to active agent 13 so as to remove a portion of the active agent surface area 13a from fluid communication with the aqueous system and to expose a portion of active agent surface area so as to allow directional dissolution of the exposed active agent surface 13b in a direction parallel to an elongated axis of the apparatus. In some embodiments, the exposed active agent may have a constant cross sectional area so as to control the rate of dissolution of active agent over the lifetime of the active agent. In some embodiments, the active agent comprises a plurality of tablets or solid pieces. In some embodiments, the active agent comprises a single tablet or solid piece. In some embodiments, the active agent comprises a granular or powdered form. In some embodiments the active agent comprises a liquid or gel.

Figure 4:
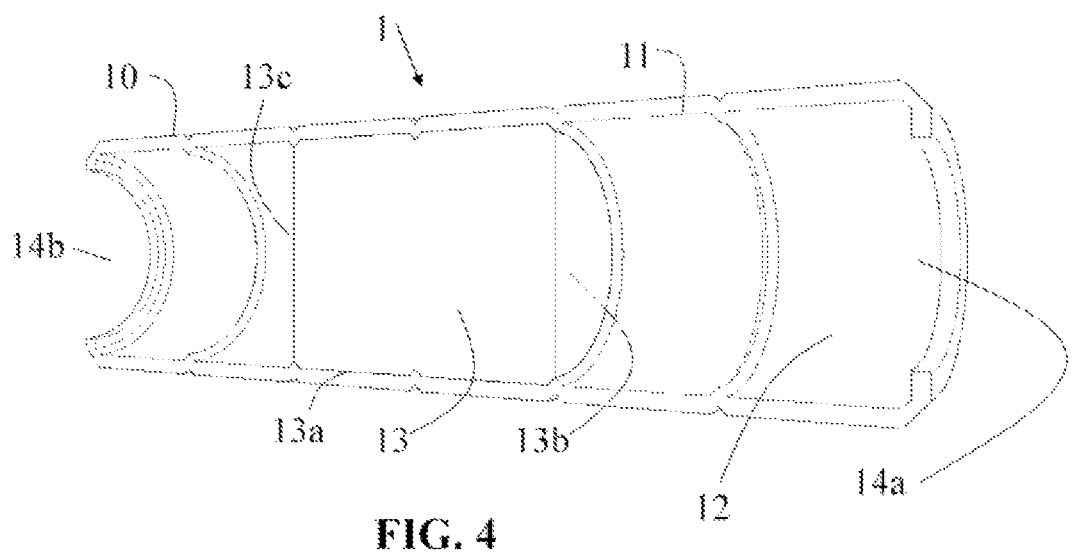
FIG. 4 is a diagrammatic cross sectional view along an elongated axis illustrating the operation of an apparatus for prolonged active agent delivery in an aqueous system of use in which a portion of an active agent has dissolved, according to an embodiment of the invention.

FIG. 4 shows a cross sectional view taken along an elongated axis of the apparatus 1 in which an active agent 13 in fluid communication with an aqueous system has dissolved over time along an elongated axis of the apparatus. In operation, the surface area of active agent 13b adjacent an opening 14a formed in the container 10 of the apparatus is dissolved at a higher rate than the surface area of active agent 13a due to coverage of the active agent by the polymeric layer 11 forming the reservoir 12 in which the active agent is housed, thus, enabling directional dissolution of the active agent 13 and the passage of said active agent through the opening 14a and release into an aqueous system of use. In some embodiments, a container may have multiple openings enabling dissolution of the active agent from multiple directions and locations as needed to achieve a desired concentration of active agent in an aqueous system of use. The opening shown in 14b allows dissolution of the active agent substantially similar in operation to opening 14a to provide multi-directional dissolution or active agent. The active agent surface area 13c is adjacent opening 14b and is dissolved in a similar manner as the active agent surface area of 13b. In some embodiments, multiple openings may be formed in the polymeric layer as a means for controlling the dissolution rate and lifetime of the bulk amount of active agent given that the active agent may be released from each opening formed in the container.

Figure 5:
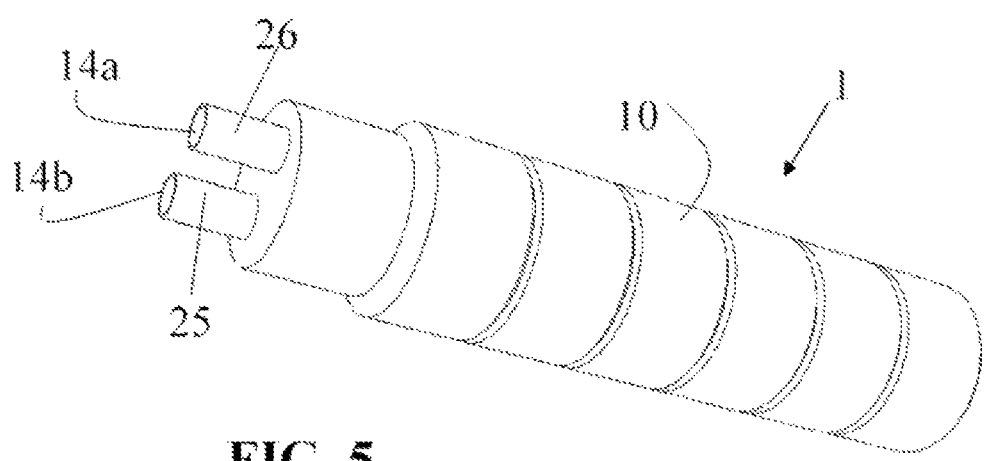
FIG. 5 is a perspective view of an apparatus for prolonged active agent delivery in an aqueous system of use, according to an embodiment of the invention.

FIG. 5 is a perspective view showing an apparatus 1 in which a first opening 14a and a second opening 14b have been formed in a container 10. At least one opening formed in the end of the container comprises an input port or spout 25 configured to allow fluid flow into the reservoir and an output port or spout 26 configured to allow fluid and active agent release into an aqueous system of use. The input port and output port may be configured in a substantially similar manner. In some embodiments, the input port may be further configured to attach a tube or hose or other suitable element which may be used to direct fluid passage into the reservoir. In some embodiments, the output port may be further configured to attach a tube or hose or other suitable element which may be used to release fluid and active agent from a reservoir and into an aqueous system of use. In some embodiments, a polymeric layer is formed in direct contact around the active agent housed within the reservoir so as to restrict or eliminate fluid communication between the active agent and the aqueous system in regions of active agent in direct contact with the polymeric layer. In some embodiments, a reservoir may be provided having a cross sectional area larger than the cross sectional area of the active agent along a given cross sectional direction so as to form a gap between the reservoir and the active agent allowing fluid communication between the active agent and aqueous system in the gap region. In some embodiments, the input port and output port are each located in a common end of the apparatus. In some embodiments, the input port and output port are located in different regions or different sides of the apparatus. In some embodiments, fluid may be actively dispensed into the fluid input port causing fluid and active agent within the reservoir to be released into an aqueous system of use through the fluid output port. In some embodiments, fluid may passively enter at least one opening in the container and active agent may be passively released through an opening in the container and into an aqueous system of use such as by means of diffusion.

Figure 6:
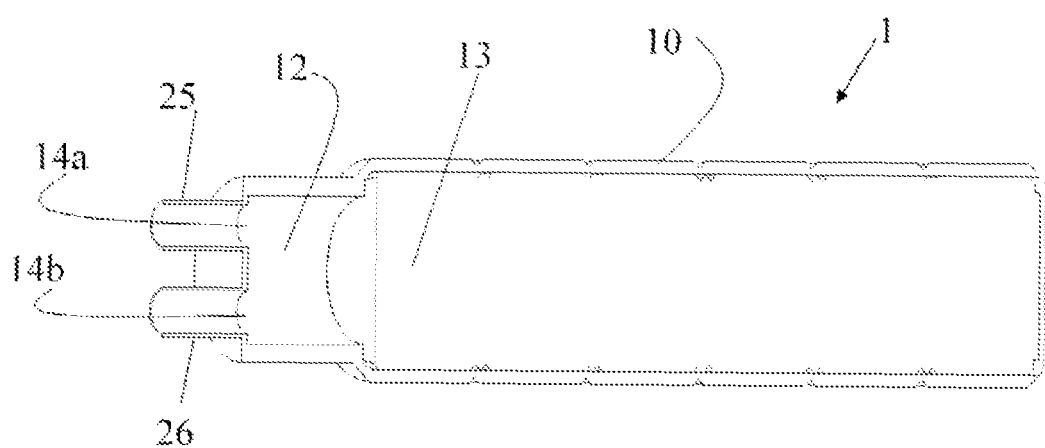
FIG. 6 is a diagrammatic cross sectional view of the apparatus illustrated in FIG. 5 in which a portion of the apparatus is removed to reveal an active agent, according to an embodiment of the invention.

FIG. 6 is a cross sectional view showing an apparatus 1 comprising a container 10 and a reservoir 12 housing an active agent 13. The container comprises two openings, a first opening 14a and a second opening 14b located in a container end. The first opening 14a may comprise a fluid input port or spout 25 configured to facilitate the passage of fluid into the reservoir. The second opening 14b may comprise a fluid output port or spout 26 configured to facilitate the passage of fluid and active agent out of the reservoir. In some embodiments, the fluid output port may be configured to release fluid and active agent into the overfill pipe of a toilet. In some embodiments, the ports may function as either as input or output ports or a combination of both input and output ports. In some embodiments, the input port is configured to connect to a fluid dispensing unit or port or valve located within the aqueous system such as to the fill valve of a toilet. In some embodiments, the input of fluid through the input port and into the reservoir forces fluid and active agent from the reservoir and into the aqueous system through the output port. In some embodiments, fluid enters the reservoir actively such as by the dispensing of fluid into the input port. In some embodiments, fluid and active agent passively move from the reservoir and into the aqueous system such as by means of diffusion. In some embodiments, the fluid input port is placed adjacent or proximal to the fluid output port. In some embodiments, the fluid input port is placed distal or on opposite sides of the apparatus from the fluid output port. The second end of the container may be sealed to prevent fluid and active agent from being exchanged into an aqueous system of use and to control the dissolution profile of the active agent housed within the reservoir.

Figure 7:
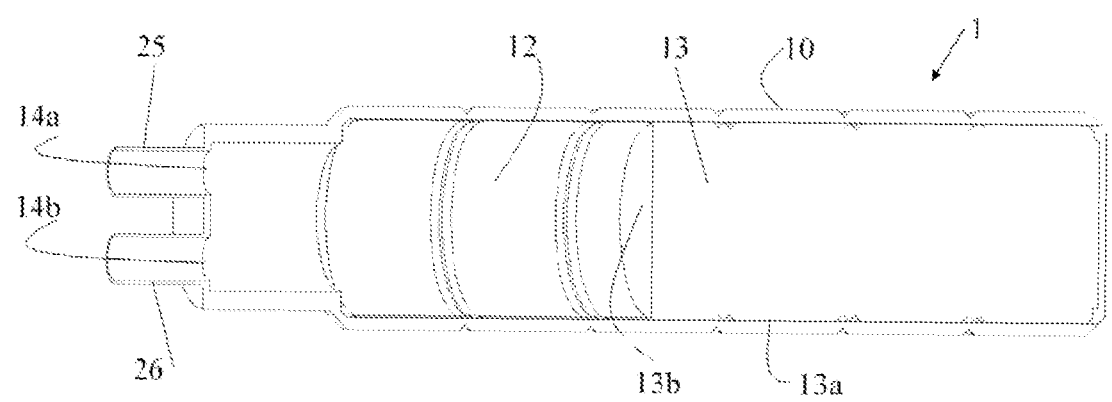
FIG. 7 is an operational cross sectional view of the apparatus illustrated in FIG. 6 in which a portion of an active agent disposed within the apparatus has been dissolved, according to an embodiment of the invention.

FIG. 7 shows an operational view of an apparatus 1 in which an active agent 13 has been dissolved and released into an aqueous system of use over time. The active agent is housed within a reservoir 12 and dissolved in a uniform direction within the reservoir along an exposed active agent surface 13b so as to prolong the lifetime of the active agent by preventing dissolution of a covered active agent surface 13a. In some embodiments, the reservoir is configured to provide directional dissolution of the active agent so as to prolong the lifetime of active agent. In some embodiments, the reservoir volume is configured to provide saturation limited dissolution of active agent by holding a volume of fluid and dissolving an amount of active agent therein until the active agent saturation limit is reached within the fluid. In some embodiments, the reservoir housing the active agent is configured to provide both directional dissolution of the active agent and saturation limited dissolution of active agent so as to increase the lifetime of active agent within an aqueous system of use. A polymeric layer 11 is in close proximity or in contact with or in close proximity to the sidewall of the active agent and fluid exchange in regions of the active agent in contact with or in close proximity to the polymeric layer is restricted so as to limit dissolution of the active agent primarily to active agent surface regions experiencing higher rates of fluid flow or fluid exchange. Because the openings in the reservoir restrict the flow of fluid into and out of the reservoir except when the fluid is exchanged into an aqueous system of use and replenished with new fluid, the dissolved active agent may reach a saturation limit within the fluid held in the reservoir so as to restrict further dissolution of the active agent. Thus, both directional dissolution and the saturation of dissolved active agent may be utilized in conjunction to extend the lifetime of active agent within an aqueous system of use. In some embodiments, the polymeric layer may comprise a bottle.

Figure 8:
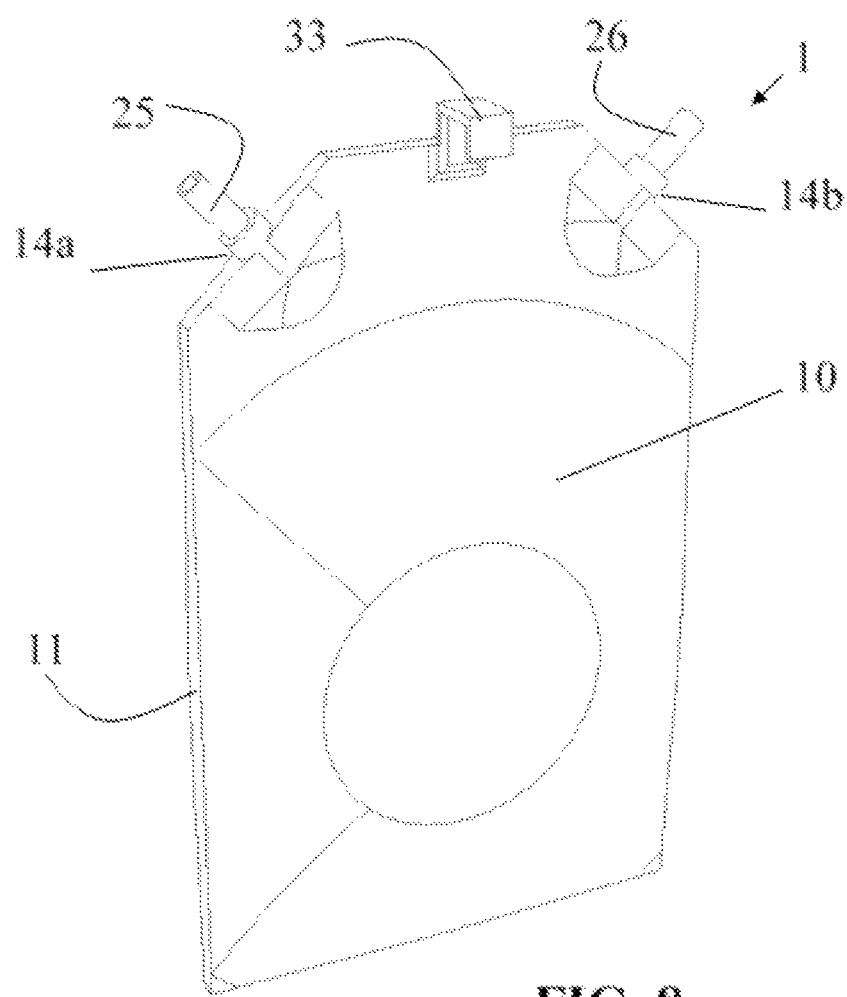
FIG. 8 is a perspective view of an apparatus for prolonged active agent delivery in an aqueous system of use, according to an embodiment of the invention.

Referring to FIG. 8, an apparatus 1 for the prolonged release of active agent into an aqueous system may comprise a container 10. A polymeric layer 11 forms a reservoir for housing an active agent. In some embodiments, the active agent comprises, consists of, or consists essentially of a solid tablet. In some embodiments, the active agent is intended for microbiological control within an aqueous system of use and may comprise, consist of, or consist essentially of 1-bromo-3-chloro-5,5-dimethylhydantoin or any suitable antimicrobial compound or combinations thereof. In the embodiment shown, the polymeric layer 11 comprises a pouch. In some embodiments, the polymeric layer may comprise, consist of, or consist essentially of a multilayered or coextruded film. A contact region between the active agent housed within the reservoir and the polymeric layer reveals the profile of the active agent tablet housed within the reservoir. In some embodiments, contact between the active agent and the inner wall of the reservoir reduces fluid flow and inhibits, reduces or prevents dissolution of the active agent in regions of contact between the active agent and the polymeric layer. A first opening 14a is formed in the container allowing the passage of fluid into the reservoir. In some embodiments, the first opening is configured with a fluid input port or spout 25 and may be configured for the attachment of a hose or tube or other means through which fluid may be dispensed. A second opening 14b is formed in the container allowing the output of fluid and active agent from the reservoir and into the aqueous system. In some embodiments, the second opening is configured with a fluid output port or spout 26 and may be configured for the attachment of a hose or tube or other means through which fluid and dissolved active agent may be released from the reservoir and into the aqueous system. In some embodiments, fluid may be dispensed into the reservoir through the input port so as to build up pressure within the reservoir forcing the release of fluid and active agent from the reservoir and into the aqueous system. In some embodiments, the flow rate of fluid between the input port and the output port is higher in reservoir regions adjacent the path of fluid flow between the ports and the fluid flow rate is lower in reservoir regions located further away from the path of fluid flow between the ports so as to dissolve the active agent faster in higher fluid flow regions of the reservoir and dissolve active agent slower in the lower fluid flow regions of the reservoir. A fixing apparatus 33 is shown providing a means for attaching, fixing or hanging the apparatus within an aqueous system. In some embodiments, the fixing apparatus is configured to provide suitable attachment within a toilet tank or other aqueous system of use. In some embodiments, the fixing apparatus comprises a hole or recess formed in the container for hanging the apparatus within an aqueous system of use. In some embodiments the fixing apparatus may comprise a flexible tube.

Figure 9:
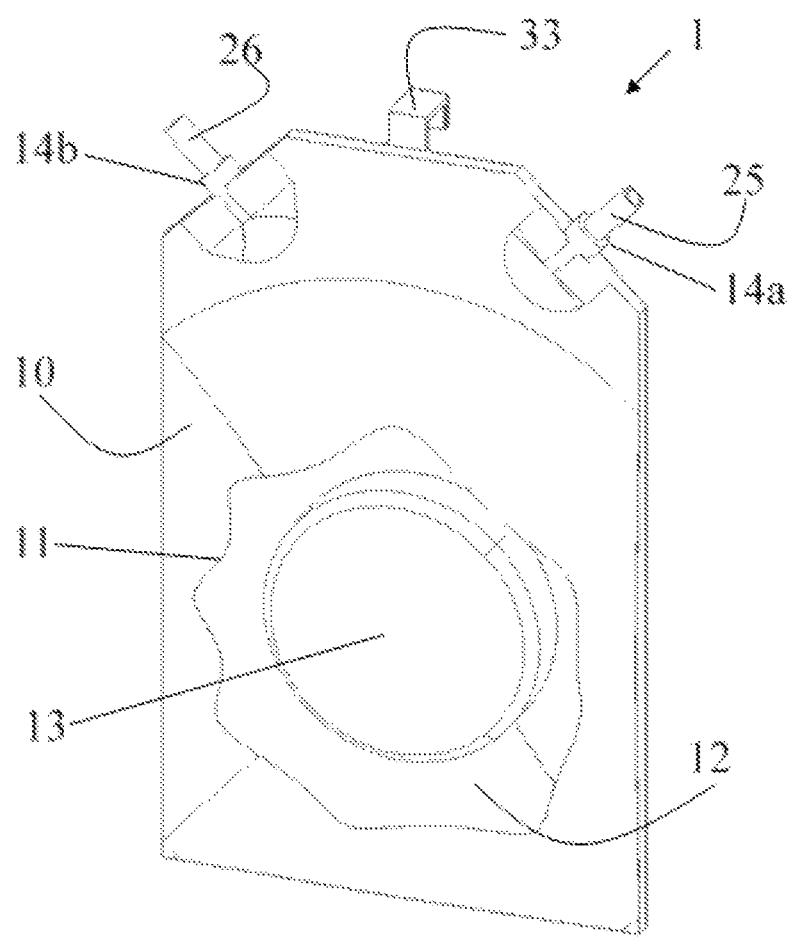
FIG. 9 is a cut-away view of the apparatus illustrated in FIG. 8 in which a portion of the apparatus has been removed to reveal an active agent, according to an embodiment of the invention.

Referring to FIG. 9, a cutaway view of an apparatus 1 for the prolonged release of an active agent into an aqueous system is shown in which a portion of the pouch has been removed to reveal an active agent 13 in tablet form housed within a reservoir 12. In some embodiments, the active agent may be a tablet form having two flat surface regions and a circumference region wherein the polymeric layer 11 makes contact with at least one flat surface of the tablet so as to slow, restrict, reduce, or inhibit tablet dissolution in the region of contact between the polymeric layer and the tablet. In some embodiments, the active agent may be in tablet form having two flat surface regions and a circumference region wherein contact between the reservoir and at least a portion of a tablet surface region or contact with multiple tablet surface regions is induced by gravity. In some embodiments, an active agent surface or multiple surfaces may be placed in contact with an adjacent active agent surface or multiple surfaces so as to slow, restrict, reduce, or inhibit active agent dissolution in active agent surface regions making contact with adjacent active agent surfaces. In some embodiments, the active agent dissolves into fluid held within the reservoir until a saturation level of dissolved active agent within the fluid is reached, after which further dissolution of the active agent is reduced, substantially reduced or inhibited. Over time, further dissolution of the active agent may be reduced or stopped near the saturation limit of dissolved active agent within fluid held within the reservoir until the fluid is exchanged into the reservoir having a lower or substantially lower concentration of active agent, for example, when a toilet is flushed. In some embodiments, a reservoir of suitable size to dissolve a given amount of active agent is provided in which dissolution of an active agent approaching a saturation limit within the reservoir provides a measured dose of active agent when the fluid in the reservoir containing the dissolved active agent is released into the aqueous system. In some embodiments a plurality of active agent tablets are housed within the reservoir.

During deployment of the apparatus into an aqueous system by a user, some embodiments may protect the user from contact with the active agent given that the active agent is housed within a container that remains substantially sealed so as to reduce potential harm to the user.

Figure 10:
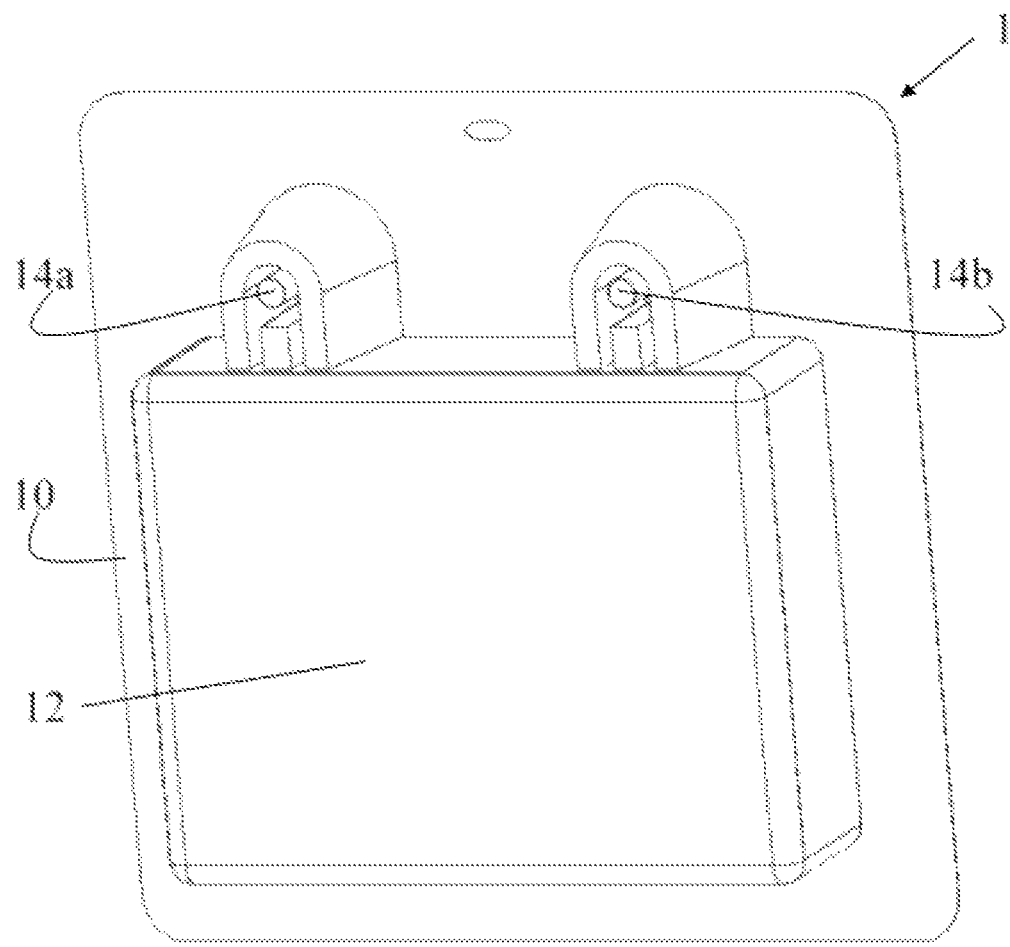
FIG. 10 is a perspective view of an apparatus for prolonged active agent delivery in an aqueous system of use, according to an embodiment of the invention.

Referring to FIG. 10, an apparatus 1 for the prolonged delivery of active agent into an aqueous system is shown. The apparatus comprises a container 10 in some embodiments comprising a thermoformed package having a cavity or recessed region forming a reservoir 12 for housing an active agent. In some embodiments, the thermoformed package may be sealed, such as by heat sealing, to form a watertight barrier around the reservoir and limit fluid exchange into and out of the reservoir to at least one opening formed in the container. A first opening 14a is formed in the container. In some embodiments the first opening may be configured for the attachment of a tube or hose or other means allowing for the input of fluid into the reservoir region. A second opening 14b is formed in the container. In some embodiments the second opening may be configured for the attachment of a tube or hose or other means allowing for the release of fluid and dissolved active agent into an aqueous system of use. In some embodiments multiple reservoirs may be formed in the container. For example, multiple recessed structures approximating the size and shape of an active agent tablet may be formed in the container. In some embodiments, the recessed structures may be in fluid communication with one another such as by means of recessed channels formed in the container or by means of a reservoir shared between at least two recessed structures.

Figure 11:
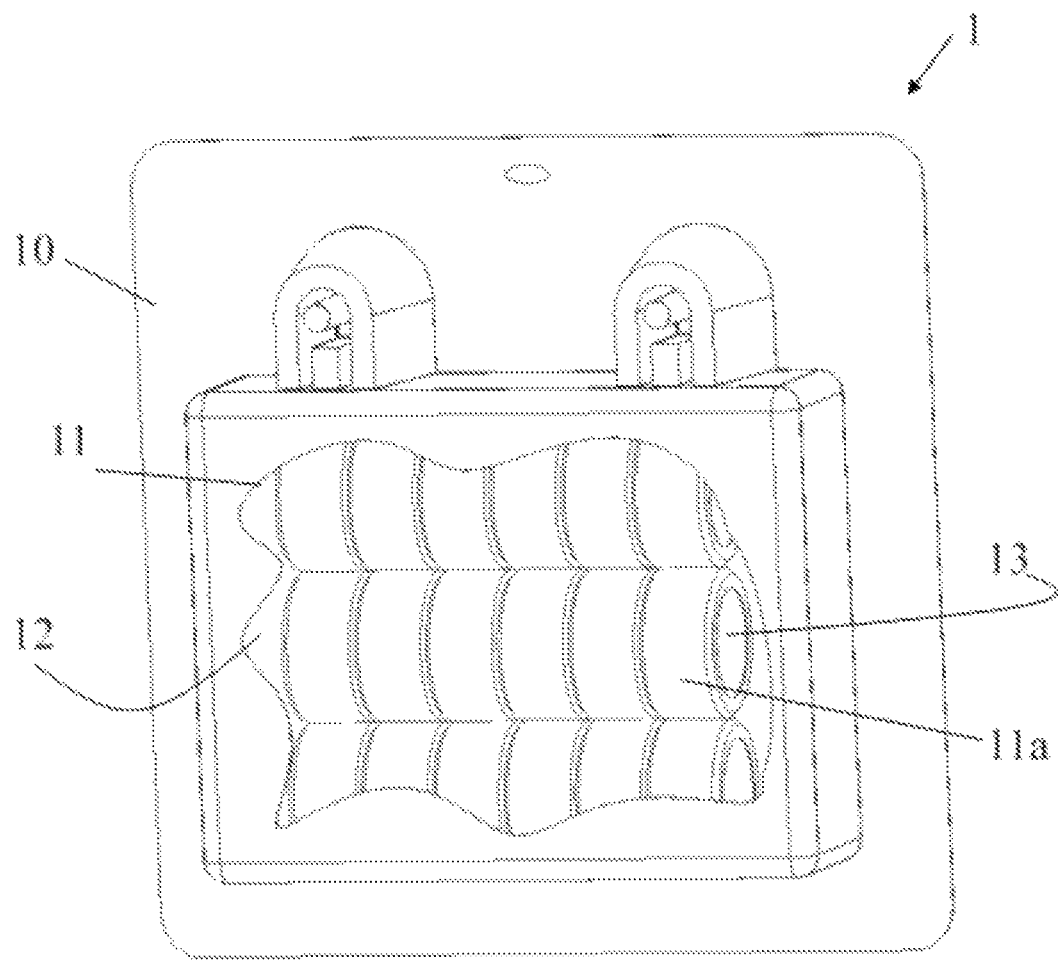
FIG. 11 is a cut-away view of the apparatus illustrated in FIG. 10 in which a portion of the apparatus has been removed to reveal an active agent, according to an embodiment of the invention.

Referring to FIG. 11, a cutaway view of an apparatus 1 for the prolonged delivery of active agent to an aqueous system reveals an active agent 13 held within a reservoir 12 as formed within a container 10 comprising a first polymeric layer 11. In some embodiments, the active agent may be further housed within a second polymeric layer 11a. In some embodiments, a second polymeric layer may cover a portion of the surface of the active agent and provide controlled dissolution of the active agent within the reservoir. In some embodiments, multiple active agent tablets may be housed within the reservoir and at least one of the active agent tablets may be further housed within a second polymeric layer. In some embodiments, the lifetime of active agent and the dose of active agent delivered to an aqueous system of use may be controlled by both providing an apparatus configured for controlling the direction of dissolution of an active agent and optimizing a reservoir volume and type of active agent to reach a defined saturation limit so as to deliver a measured amount of active agent into an aqueous system of use. In some embodiments at least one type of active agent is housed within a reservoir. In some embodiments a mixture of active agent sizes in tablet form including approximately 3 inch diameter tablets and approximately 1 inch diameter tablets are housed within a reservoir.

Figure 12:
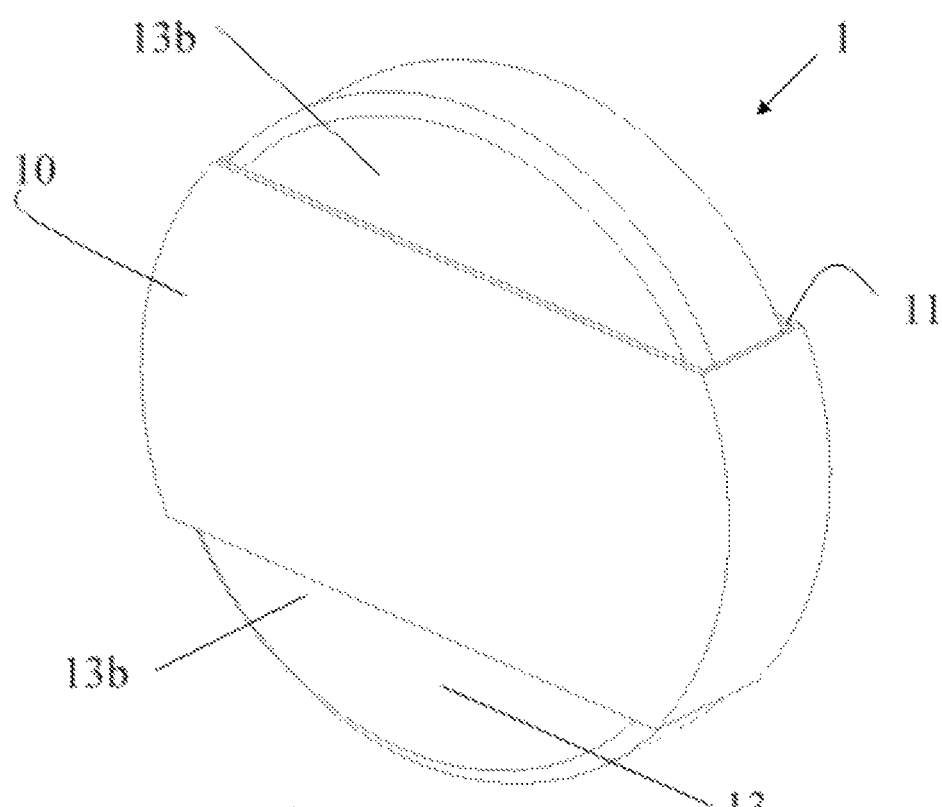
FIG. 12 is a perspective view of an apparatus for prolonged active agent delivery in an aqueous system of use, according to an embodiment of the invention.
Figure 13:
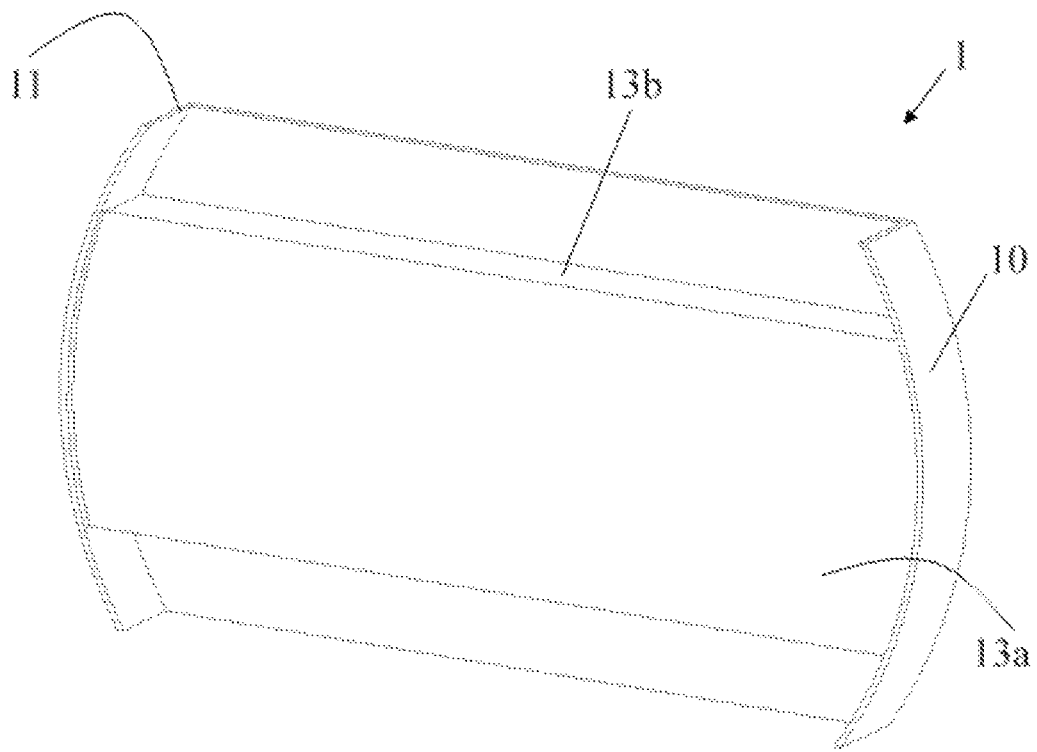
FIG. 13 is an operational cross sectional view of the apparatus illustrated in FIG. 12 in which an active agent disposed within the apparatus has been dissolved, according to an embodiment of the invention.

Referring to FIG. 12 and FIG. 13, a perspective view (FIG. 12) and an operational cross sectional view (FIG. 13) of an apparatus 1 for the prolonged release of active agent into an aqueous system show a polymeric layer 11 covering a portion of an active agent 13 in tablet form. The active agent tablet protrudes from the container 10 providing an exposed active agent surface region 13b having a high surface area in fluid communication with an aqueous system and a covered active agent surface region 13a that is sequentially dissolved upon dissolution of said exposed active agent surface region 13b. Some aqueous systems may benefit from an initial high dose of active agent to substantially increase the concentration of active agent within the aqueous system to a desired or effective concentration followed by a relatively slower release of active agent over a longer period of time so as to maintain the concentration levels of active agent in an optimal concentration window.

In some embodiments, an exposed region of active agent having a high surface area for rapid dissolution may initially be provided followed by the sequential exposure and dissolution of a portion of active agent having a relatively reduced surface area or slower dissolution rate so as to provide an initial high active agent dissolution rate followed by a prolonged lower active agent dissolution rate. In initial operation, the exposed portion of active agent is dissolved rapidly to release a high amount of active agent into an aqueous system of use and dissolution of a covered portion of active agent is slowed or inhibited. In prolonged operation, complete or partial dissolution of an exposed portion of active agent having a relatively high dissolution rate may sequentially expose a portion of active agent in a covered region having a relatively low dissolution rate.

Figure 14:
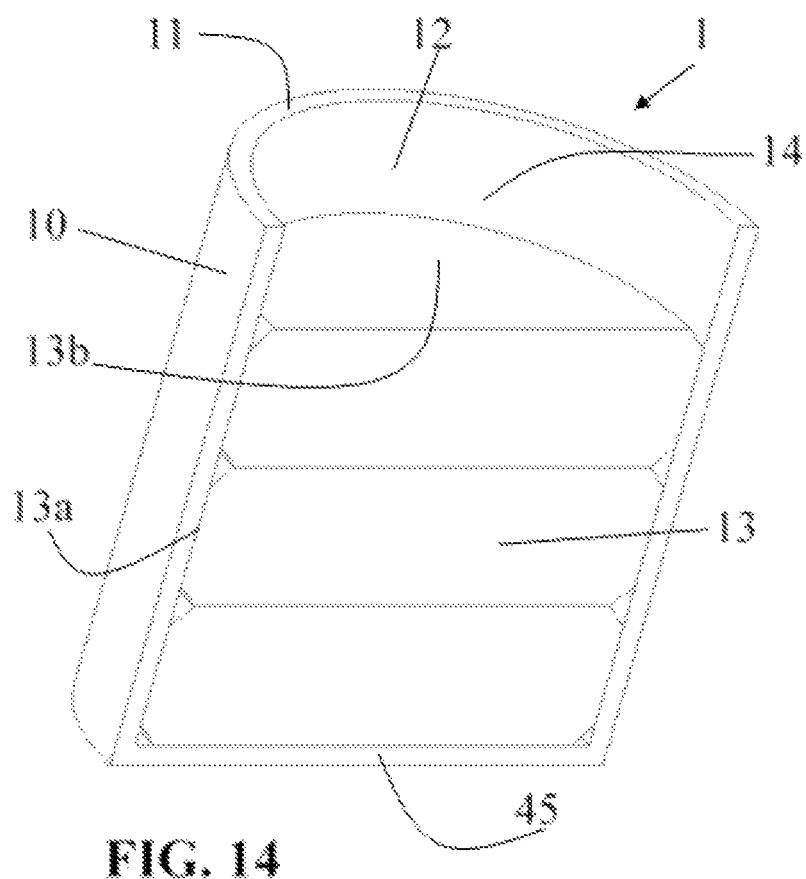
FIG. 14 is a diagrammatic cross sectional view of the apparatus for prolonged active agent delivery in an aqueous system of use, according to an embodiment of the invention.

Referring to FIG. 14, a cross-sectional view of an apparatus 1 for the prolonged release of active agent into an aqueous system is shown in which a container 10 comprising a polymeric layer 11 forms a reservoir 12 for housing an active agent 13. An opening 14 is formed in one end of the container. An exposed surface of active agent 13b may be located adjacent the opening in fluid communication with the aqueous system. A covered surface of active agent 13a is provided in regions of contact or in regions of reduced fluid flow between the polymeric layer and the active agent. A base 45 forms a sealed end of the container. The active agent may comprise a plurality of tablets oriented end-to-end or stacked within the reservoir. In operation, the apparatus may be positioned on the bottom surface of an aqueous system such as the bottom surface of a toilet tank with the container opening facing upwards and a base facing downwards allowing fluid communication with an active agent disposed in the reservoir. In some embodiments, the apparatus may be positioned vertically within an aqueous system with an opening facing upward and a base facing downward and dissolution of the active agent occurs directionally from the opening to the base. In some embodiments, the apparatus may be positioned vertically within an aqueous system with an opening facing downward such as by hanging the apparatus from a fixing means and providing directional dissolution of the active agent from the opening to the base. In some embodiments, the active agent tablets may be in gravity contact to sequentially expose a second active agent to fluid communication with an aqueous system upon dissolution of a first active agent. In some embodiments, the polymeric layer may be formed by injection molding. In some embodiments, the polymeric layer may comprise a heat shrinkable material. In some embodiments, the polymeric layer may comprise a pouch or bag.

Although specific embodiments have been described and illustrated herein, it will be appreciated by those of ordinary skill in the art that any arrangement that achieves the same purpose may be substituted for the specific embodiments shown. Many adaptations will be apparent to those of ordinary skill in the art. Therefore, this application is intended to cover any adaptations or variations.

What is claimed is:

1. An apparatus for the controlled release of an active agent into an aqueous system, the apparatus comprising:
   at least one active agent portion, said active agent portion comprising a body, said body defining a first side, a second side, and a third side;
   a container, said container comprising a first polymeric layer spaced apart from a second polymeric layer, said first polymeric layer comprising a first inside surface, said second polymeric layer comprising a second inside surface, said active agent portion retained within said container, said active agent portion held between said first and second polymeric layers with said first inside surface contacting said first side of said active agent portion and said second inside surface contacting said second side of said active agent portion, said container defining a reservoir adjacent said third side;

an inlet opening defined in the container, said inlet opening extending through the container and into the reservoir, said inlet opening configured for fluid connection with a fluid source, thereby enabling a supply of fluid to flow into the reservoir from the fluid source to dissolve a portion of said active agent from said third side of said active agent portion thereby creating a solution, wherein said supply of fluid dissolves said portion of said active agent from said third side before dissolving said first or second sides; and an outlet opening defined in the container, said outlet opening extending through the container and into the reservoir, said outlet opening configured for allowing the solution to flow out of the reservoir and into said aqueous system.

2. The apparatus of claim 1 wherein said apparatus comprises a first tube connected to the inlet opening.

3. The apparatus of claim 1 wherein the apparatus comprises a securing means for positioning said apparatus within said aqueous system.

4. The apparatus of claim 3, wherein said aqueous system is a toilet having a toilet tank, and wherein the securing means for positioning said apparatus comprises a metal clip for clipping the apparatus to a back side of said toilet tank.

5. The apparatus of claim 1 wherein the first and second polymeric layers comprise a heat-shrinkable material.

6. The apparatus of claim 5, wherein the shrinking of said heat-shrinkable material results in said active agent portion being held between said first and second polymeric layers with said first inside surface contacting said first side of said active agent portion and said second inside surface contacting said second side of said active agent portion.

7. The apparatus of claim 1 wherein the apparatus comprises a second tube connected to the outlet opening.

8. The apparatus of claim 1 wherein the container comprises a thermoformed package.

9. The apparatus of claim 1 wherein said outlet opening comprises a spout.

10. The apparatus of claim 1, wherein said active agent portion comprises a tablet.

11. The apparatus of claim 1, wherein said active agent portion comprises at least two stacked tablets.

12. The apparatus of claim 1, wherein said apparatus comprises a first tube connected to the inlet opening and a second tube connected to the outlet opening, wherein the first tube is configured to connect with a toilet tank water fill valve, and wherein the second tube is configured to connect with a toilet tank overflow tube.

13. The apparatus of claim 1, wherein said aqueous system comprises a toilet.

14. An apparatus for the controlled release of an active agent having antimicrobial properties into a toilet, the apparatus comprising:

at least one active agent tablet, said active agent tablet comprising a generally cylindrical body defining a first end, a second end, and a side;

a container, said container comprising a first polymeric layer spaced apart from a second polymeric layer, said first polymeric layer comprising a first inside surface, said second polymeric layer comprising a second inside surface, said active agent tablet retained within said container, said active agent tablet held between said first and second polymeric layers with said first inside surface contacting said first end of said active agent tablet and said second inside surface contacting said second end of said active agent tablet, said container defining a reservoir adjacent said side of said active agent tablet;

an inlet opening defined in the container, said inlet opening extending through the container and into the reservoir, said inlet opening configured for fluid connection with an inlet opening connecting to a toilet tank water fill valve via a first length of tubing, thereby enabling a supply of water to flow into the reservoir from the toilet tank water fill valve to dissolve a portion of said active agent from said side of said active agent tablet thereby creating a solution, wherein because said first inside surface contacting said first end prevents said water from dissolving said first end, and because said second inside surface contacting said second end prevents said water from dissolving said second end, said supply of water dissolves said portion of said active agent from said side before dissolving said first or second ends; and an outlet opening defined in the container, said outlet opening extending through the container and into the reservoir, said outlet opening configured for allowing the solution to flow out of the reservoir, into a second length of tubing, and into a toilet tank overflow tube of said toilet.

15. The apparatus of claim 14 wherein the apparatus comprises a securing means for positioning said apparatus within a toilet tank.

16. The apparatus of claim 14 wherein the first and second polymeric layers comprise a heat-shrinkable material.

17. The apparatus of claim 16, wherein the shrinking of said heat-shrinkable material results in said active agent tablet being held between said first and second polymeric layers with said first inside surface contacting said first end of said active agent table and said second inside surface contacting said second end of said active agent tablet.

18. The apparatus of claim 14, wherein:

said active agent tablet comprises at least two stacked active agent tablets together defining said first end, said second end, and said side; and said first and second polymeric layers comprise a heat-shrinkable material;

wherein the shrinking of said heat-shrinkable material results in said stacked active agent tablets being held between said first and second polymeric layers with said first inside surface contacting said first end of said stacked active agent tablets and said second inside surface contacting said second end of said stacked active agent tablets.

19. The apparatus of claim 18, wherein said apparatus comprises a first tube connected to the inlet opening and a second tube connected to the outlet opening, wherein the first tube is configured to connect with a toilet tank water fill valve, and wherein the second tube is configured to connect with a toilet tank overflow tube.

20. The apparatus of claim 18, wherein said toilet comprises a toilet tank, wherein the apparatus comprises a securing means for positioning said apparatus, and wherein the securing means for positioning said apparatus comprises a metal clip for clipping the apparatus to a back side of said toilet tank.

21. An apparatus for the controlled release of an active agent having antimicrobial properties into a toilet, the apparatus comprising:
- a stack of active agent tablets, said stack comprising a generally cylindrical body defining a first end, a second end, and a side;
- a container, said container comprising a first polymeric layer spaced apart from a second polymeric layer, said first polymeric layer comprising a first inside surface, said second polymeric layer comprising a second inside surface, said stack of active agent tablets retained within said container, said stack of active agent tablets held between said first and second polymeric layers with said first inside surface contacting said first end of said stack of active agent tablets and said second inside surface contacting said second end of said stack of active agent tablets, said container defining a reservoir adjacent said side of said stack of active agent tablets;
- an inlet opening defined in the container, said inlet opening extending through the container and into the reservoir, said inlet opening configured for fluid connection with an inlet opening connecting to a toilet tank water fill valve via a first length of tubing, thereby enabling a supply of water to flow into the reservoir from the toilet tank water fill valve to dissolve a portion of said active agent from said side of said stack of active agent tablets thereby creating a solution, wherein because said first inside surface contacting said first end prevents said water from dissolving said first end, and because said second inside surface contacting said second end prevents said water from dissolving said second end, said supply of water dissolves said portion of said active agent from said side before dissolving said first or second ends; and
- an outlet opening defined in the container, said outlet opening extending through the container and into the reservoir, said outlet opening configured for allowing the solution to flow out of the reservoir, into a second length of tubing, and into a toilet tank overflow tube of said toilet.

22. The apparatus of claim 21 wherein the apparatus comprises a securing means for positioning said apparatus within a toilet tank.

23. The apparatus of claim 21 wherein the first and second polymeric layers comprise a heat-shrinkable material.

24. The apparatus of claim 23, wherein the shrinking of said heat-shrinkable material results in said stack of active agent tablets being held between said first and second polymeric layers with said first inside surface contacting said first end of said stack of active agent tablets and said second inside surface contacting said second end of said stack of active agent tablets.

25. The apparatus of claim 21, wherein:
- said first and second polymeric layers comprise a heat-shrinkable material;
- wherein the shrinking of said heat-shrinkable material results in said stack of active agent tablets being held between said first and second polymeric layers with said first inside surface contacting said first end of said stack of active agent tablets and said second inside surface contacting said second end of said stack of active agent tablets.

26. The apparatus of claim 25, wherein said apparatus comprises a first tube connected to the inlet opening and a second tube connected to the outlet opening, wherein the first tube is configured to connect with a toilet tank water fill valve, and wherein the second tube is configured to connect with a toilet tank overflow tube.

27. The apparatus of claim 26, wherein said toilet has a toilet tank, wherein the apparatus comprises a securing means for positioning said apparatus, and wherein the securing means for positioning said apparatus comprises a metal clip for clipping the apparatus to a back side of said toilet tank.

28. An apparatus for the controlled release of an active agent having antimicrobial properties into a toilet, the apparatus comprising:
- a stack of active agent tablets, said stack comprising a generally cylindrical body defining a first end, a second end, and a side;
- a container, said container comprising a first polymeric layer spaced apart from a second polymeric layer, said first polymeric layer comprising a first inside surface, said second polymeric layer comprising a second inside surface, said stack of active agent tablets retained within said container, said stack of active agent tablets held between said first and second polymeric layers with said first inside surface contacting said first end of said stack of active agent tablets and said second inside surface contacting said second end of said stack of active agent tablets, said container defining a reservoir adjacent said side of said stack of active agent tablets, wherein said first and second polymeric layers comprise a heat-shrinkable material, wherein the shrinking of said heat shrinkable material results in said stack of active agent tablets being held between said first and second polymeric layers with said first inside surface contacting said first end of said stack of active agent tablets and said second inside surface contacting said second end of said stack of active agent tablets;
- an inlet opening defined in the container, said inlet opening extending through the container and into the reservoir, said inlet opening configured for fluid connection with an inlet opening connecting to a toilet tank water fill valve via a first length of tubing, thereby enabling a supply of water to flow into the reservoir from the toilet tank water fill valve to dissolve a portion of said active agent from said side of said stack of active agent tablets thereby creating a solution, wherein because said first inside surface contacting said first end prevents said water from dissolving said first end, and because said second inside surface contacting said second end prevents said water from dissolving said second end, said supply of water dissolves said portion of said active agent from said side before dissolving said first or second ends; and
- an outlet opening defined in the container, said outlet opening extending through the container and into the reservoir, said outlet opening configured for allowing the solution to flow out of the reservoir, into a second length of tubing, and into a toilet tank overflow tube of said toilet.

29. The apparatus of claim 28 wherein the apparatus comprises a securing means for positioning said apparatus within a toilet tank.

30. The apparatus of claim 28, wherein said apparatus comprises a first tube connected to the inlet opening and a second tube connected to the outlet opening, wherein the first tube is configured to connect with a toilet tank water fill valve, and wherein the second tube is configured to connect with a toilet tank overflow tube.

31. The apparatus of claim 28, wherein said toilet comprises a toilet tank, wherein the apparatus comprises a securing means for positioning said apparatus, and wherein the securing means for positioning said apparatus comprises a metal clip for clipping the apparatus to a back side of said toilet tank.

* * * * *